(12) United States Patent
Nanba et al.

(10) Patent No.: US 7,139,131 B2
(45) Date of Patent: Nov. 21, 2006

(54) ZOOM LENS SYSTEM AND IMAGE PICKUP APPARATUS HAVING THE SAME

(75) Inventors: Norihiro Nanba, Tochigi-ken (JP); Hiroyuki Hamano, Ibaraki-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 11/144,200

(22) Filed: Jun. 2, 2005

(65) Prior Publication Data
US 2005/0270661 A1 Dec. 8, 2005

(30) Foreign Application Priority Data
Jun. 4, 2004 (JP) ............... 2004-167215

(51) Int. Cl.
*G02B 15/14* (2006.01)
(52) U.S. Cl. ............... 359/687; 359/688
(58) Field of Classification Search ............... 359/688, 359/687
See application file for complete search history.

(56) References Cited

U.S. PATENT DOCUMENTS

| 3,097,399 | A | | 7/1963 | Alston |
| 4,709,997 | A | | 12/1987 | Terasawa |
| 5,737,128 | A | * | 4/1998 | Usui ............... 359/686 |
| 6,404,561 | B1 | | 6/2002 | Isono et al. |
| 6,449,433 | B1 | | 9/2002 | Hagimori et al. |
| 6,594,087 | B1 | | 7/2003 | Uzawa et al. |
| 6,646,814 | B1 | * | 11/2003 | Uzawa et al. ............... 359/687 |

FOREIGN PATENT DOCUMENTS

| JP | 03-58490 | 9/1991 |
| JP | 6-43363 | 2/1994 |
| JP | 7-13079 | 1/1995 |
| JP | 8-248317 | 9/1996 |
| JP | 3097399 | 8/2000 |
| JP | 2001-194590 | 7/2001 |
| JP | 2001-350093 | 12/2001 |
| JP | 2002-62748 | 2/2002 |

OTHER PUBLICATIONS

English Translation of Japanese Patent Publication No. 06-043363.
English Translation of Japanese Patent Publication No. 07-013079.
English Translation of Japanese Patent Publication No. 08-248317.

* cited by examiner

*Primary Examiner*—Scott J. Sugarman
(74) *Attorney, Agent, or Firm*—Morgan & Finnegan, L.L.P.

(57) ABSTRACT

A zoom lens system capable of correcting a secondary spectrum is disclosed. The zoom lens system includes a first lens unit with a positive optical power, a second lens unit with a negative optical power, an aperture stop, and a rear lens component including at least one lens unit in an order from an object side to an image side. In the zoom lens system, during zooming from a wide angle end to a telephoto end, an interval between the first lens unit and the second lens unit increases, and an interval between the second lens unit and the aperture stop decreases. Then, a material satisfying the following conditions:

$$\nu d1n < 35$$

$$\theta gF1n < -0.0027 \nu d1n + 0.680$$

is used for the negative lens in the first lens unit. Herein, $\nu d1n$ represents an Abbe number, and $\theta gF1n$ represents a partial dispersion ratio.

10 Claims, 14 Drawing Sheets

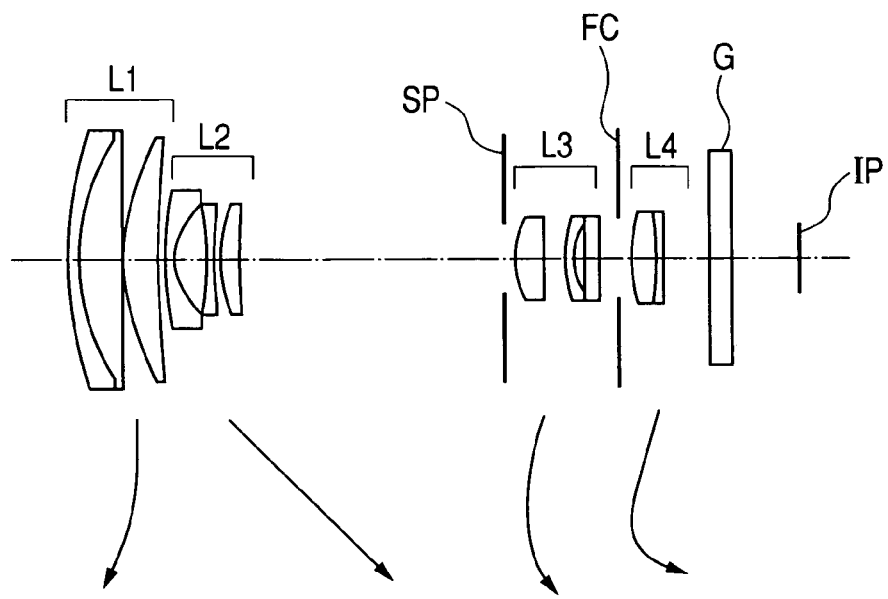
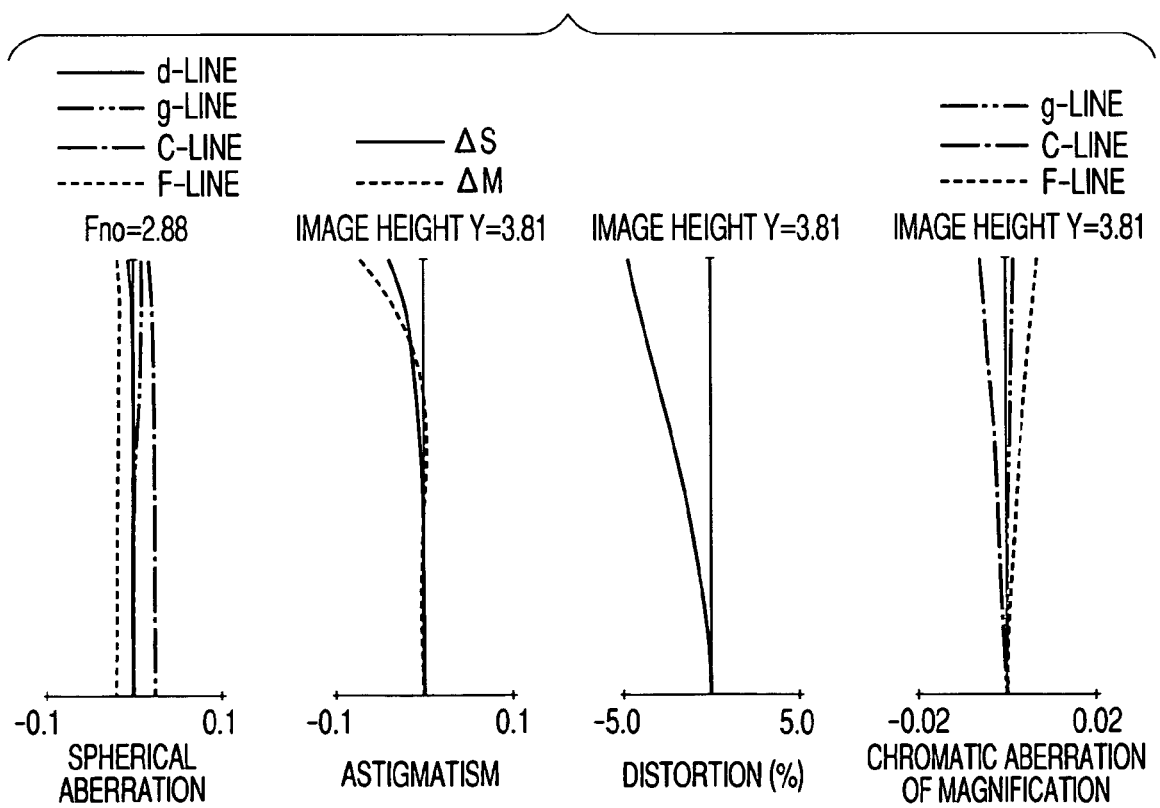

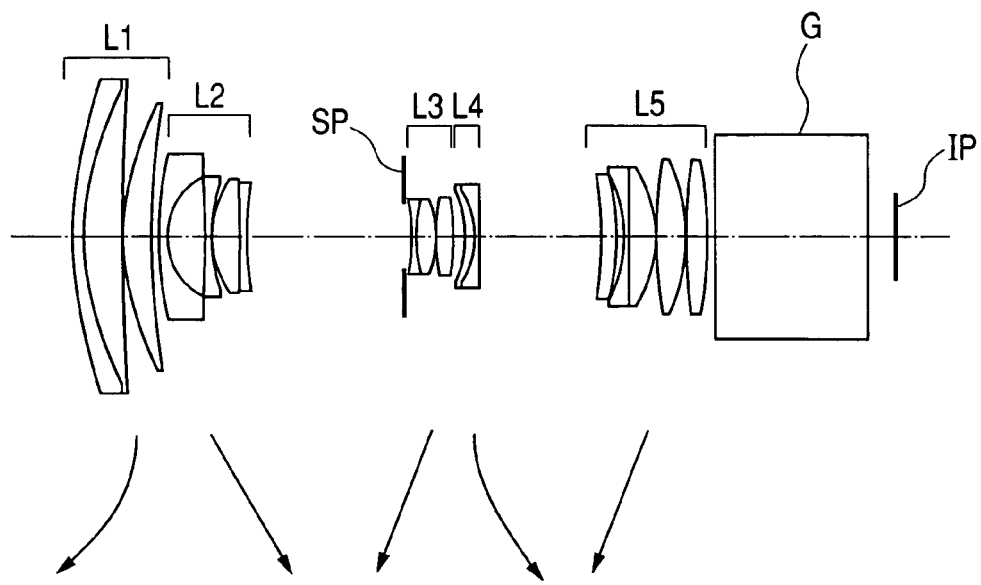
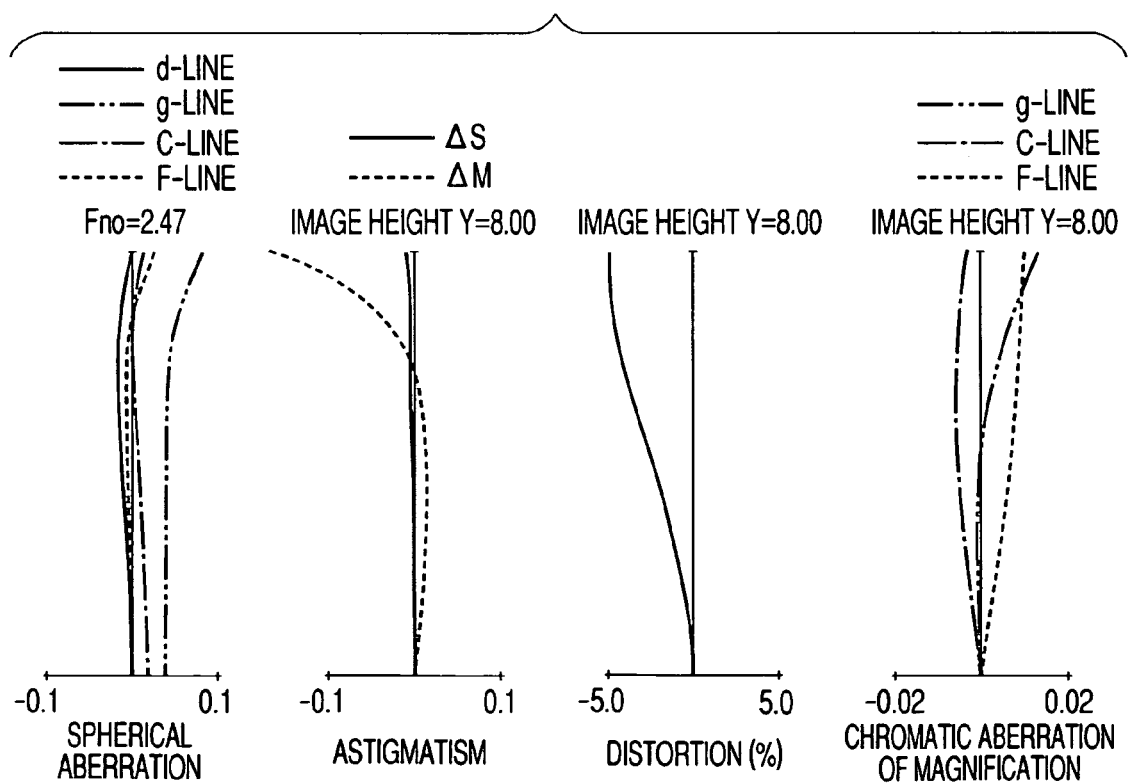

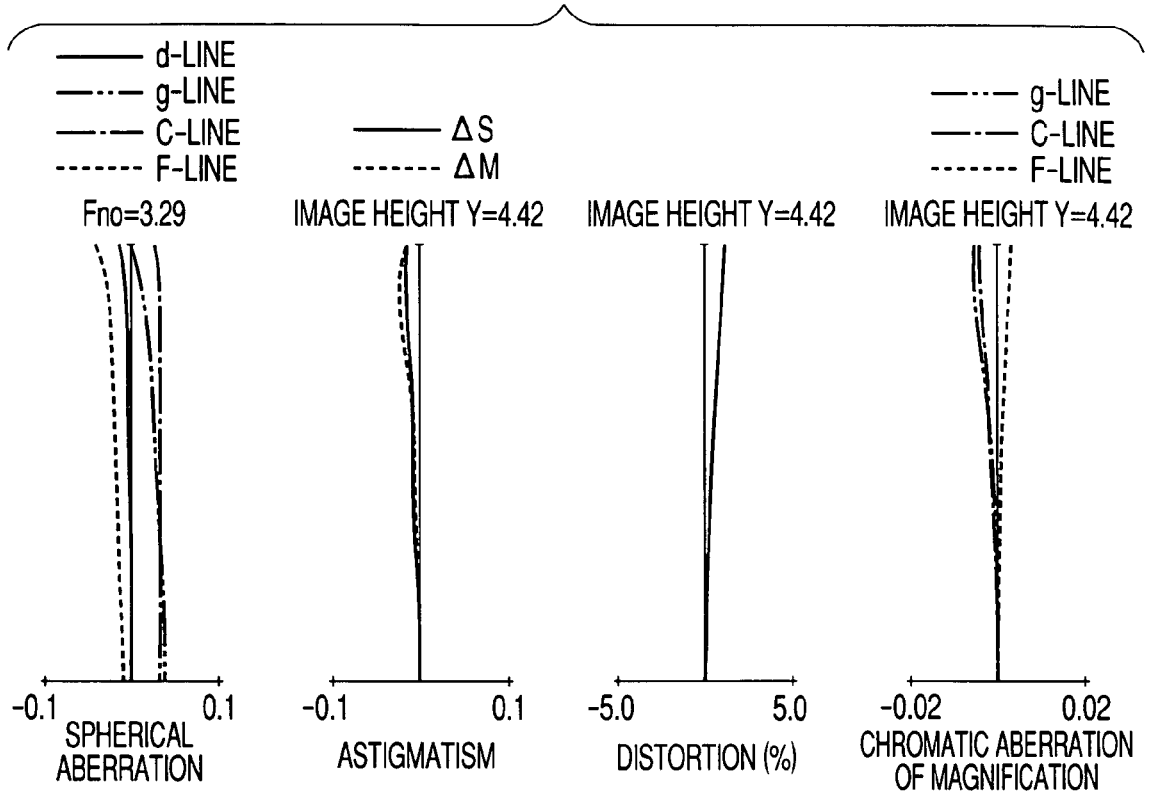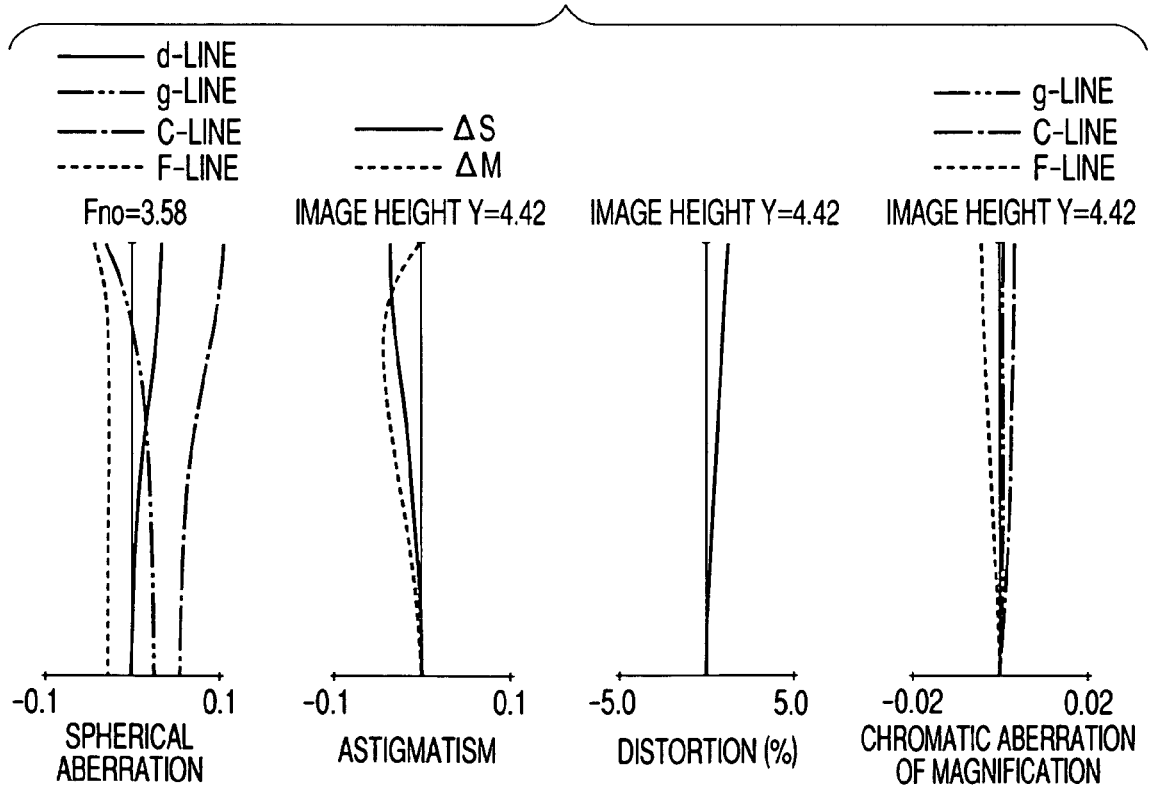

ZOOM LENS SYSTEM AND IMAGE PICKUP APPARATUS HAVING THE SAME

BACKGROUND OF THE INVENTION

1. Field of the Invention

The present invention relates to a zoom lens system, which is preferably used as an image taking optical system for a silver film camera, a digital still camera, a video camera and the like.

2. Related Background Art

Along with the enhancement in resolution of a digital still camera, i.e., an increase of the number of pixels in the digital still camera, there is a demand for correcting a monochromatic aberration and sufficiently correcting a chromatic aberration in a zoom lens as an image taking optical system for a solid-state image pickup element with a high resolution. In particular, when the focal length at a telephoto end of a zoom lens increases as a result of an increase in a zoom ratio or an imaging magnification, there is a demand for the reduction in a secondary spectrum, as well as the primary achromatism, regarding a chromatic aberration.

Conventionally, in order to correct a secondary spectrum of an axial chromatic aberration (longitudinal chromatic aberration) at a telephoto end, a number of zoom lenses using anomalous dispersion (extraordinary dispersion) glass have been known. Furthermore, as a zoom lens configuration suitable for a high zoom ratio, there is a positive lead type in which a lens unit closest to an object side has a positive refractive power.

For example, JP H06-43363 A and JP H03-58490 B (counterpart: U.S. Pat. No. 4,709,997) disclose an example using glass having anomalous dispersibility for a zoom lens in which three lens units having positive, negative, and positive refractive powers are arranged in this order from the object side.

For example, JP 3097399 B, JP 2002-62748 A (counterpart: U.S. Pat. No. 6,594,087), JP H08-248317 A, and JP 2001-194590 A (counterpart: U.S. Pat. No. 6,404,561) disclose an example using glass having anomalous dispersibility for a zoom lens in which four lens units having positive, negative, positive, and positive refractive powers are arranged in this order from the object side.

For example, JP 2001-350093 A (counterpart: U.S. Pat. No. 6,449,433) discloses an example using glass having anomalous dispersibility for a zoom lens in which five lens units having positive, negative, positive, negative, and positive refractive powers are arranged in this order from the object side.

Any of the above-mentioned conventional examples use glass having an Abbe number exceeding 80 for a positive lens in a first lens unit having a positive refractive power. In general, low dispersion glass having an Abbe number exceeding 80 has anomalous dispersibility. The use of such glass for a positive lens in a first lens unit of a positive lead type is effective for reducing a secondary spectrum at a telephoto end.

However, the above-mentioned documents disclose no example using a material having anomalous dispersibility for a negative lens in the first lens unit, which are focused on only the reduction in a secondary spectrum by use of the anomalous dispersion characteristics of a positive lens. In order to further reduce a secondary spectrum amount with such a configuration, it is considered to use a material having high anomalous dispersibility such as fluorite or to increase the number of positive lenses in the first lens unit. The former has a problem in terms of cost, and the latter has a problem in terms of enlargement.

SUMMARY OF THE INVENTION

The present invention has been made in view of the above-mentioned conventional examples, and has an object to realize a zoom lens system in which a secondary spectrum is corrected satisfactorily without increasing a cost.

An illustrative zoom lens system of the present invention includes a first lens unit having a positive refractive power (optical power=inverse of focal length), a second lens unit having a negative refractive power, an aperture stop, and a rear lens component including at least one lens unit in this order from an object side to an image side, with an interval between the first lens unit and the second lens unit increasing and an interval between the second lens unit and the aperture stop decreasing during zooming from a wide angle end to a telephoto end, in which the following conditional formulas are satisfied:

$$vd1n<35$$

$$\theta gF1n<-0.0027vd1n+0.680$$

where an Abbe number of a material constituting at least one negative lens forming the first lens unit is $vd1n$, and a partial dispersion ratio is $\theta gF1n$.

BRIEF DESCRIPTION OF THE DRAWINGS

FIG. 5 is a cross-sectional view of a zoom lens according to Embodiment 3 of the present invention;

FIGS. 6A, 6B and 6C shows various aberrations of the zoom lens according to Embodiment 3 of the present invention;

FIG. 9 is a cross-sectional view of a zoom lens according to Embodiment 5 of the present invention;

FIGS. 10A, 10B and 10C show various aberrations of the zoom lens according to Embodiment 5 of the present invention;

FIG. 12A, 12B and 12C show various aberrations of the zoom lens according to Embodiment 6 of the present invention;

DESCRIPTION OF THE PREFERRED EMBODIMENTS

Hereinafter, a zoom lens system of the present invention will be described by way of an example with reference to the drawings. The zoom lens disclosed in the present example is an image taking optical system for an image pickup apparatus such as a digital still camera and a video camera for forming an object image on a solid-state image pickup element (photoelectric conversion element) such as a CCD sensor and a CMOS sensor.

FIGS. 1, 3, 5, 7, 9, and 11 are cross-sectional views at a wide angle end of the zoom lenses of Embodiments 1 to 6. FIGS. 2A–2C, 4A–4C, 6A–6C, 8A–8C, 10A–10C, and 12A–12C respectively show aberrations of the zoom lenses of Embodiments 1 to 6. FIGS. 2A, 4A, 6A, 8A, 10A, and 12A respectively show a state of a wide angle end. FIGS. 2B, 4B, 6B, 8B, 10B, and 12B respectively show a state at an intermediate focal position. FIGS. 2C, 4C, 6C, 8C, 10C, and 12C respectively show a state at a telephoto end.

In each lens cross-section, the left side corresponds to an object side (front side), and the right side corresponds to an image side (rear side). L1 denotes a first lens unit having a negative refractive power (optical power=inverse of focal length). L2 denotes a second lens unit having a positive refractive power. L3 denotes a third lens unit having a positive power. L4 denotes a fourth lens unit having a positive refractive power in Embodiments 1 to 4, and a negative refractive power in Embodiments 5 and 6. L5 denotes a fifth lens unit having a positive refractive power in Embodiments 5 and 6. SP denotes an aperture stop, and FC denotes a flare-cut stop. G denotes a glass block provided in terms of design so as to correspond to a parallel plate present in an optical path such as an optical low-pass filter, an infrared-cut filter, or a cover glass. IP denotes an image plane on which a photosensitive surface of a solid-state image pickup element (photoelectric conversion element) such as a CCD sensor or a CMOS sensor is positioned.

The zoom lens in each embodiment includes a first lens unit L1 having a positive refractive power, a second lens unit L2 having a negative refractive power, an aperture stop, and a rear lens component including at least one lens unit in an order from the object side to the image side. The rear end component is composed of a third lens unit L3 and a fourth lens unit L4 in Embodiments 1 to 4, and is composed of a third lens unit L3 to a fifth lens unit L5 in Embodiments 5 and 6. In any embodiment, during zooming from a wide angle end to a telephoto end, the interval between the first lens unit L1 and the second lens unit L2 becomes large, and the interval between the second lens unit L2 and the aperture stop SP becomes small.

Figure 1:
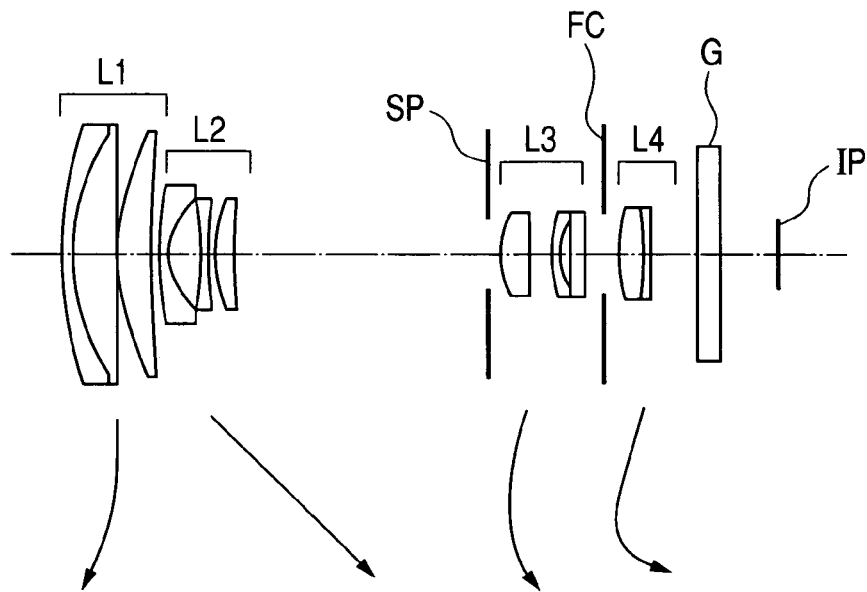
FIG. 1 is a cross-sectional view of a zoom lens according to Embodiment 1 of the present invention.
Figure 2A:
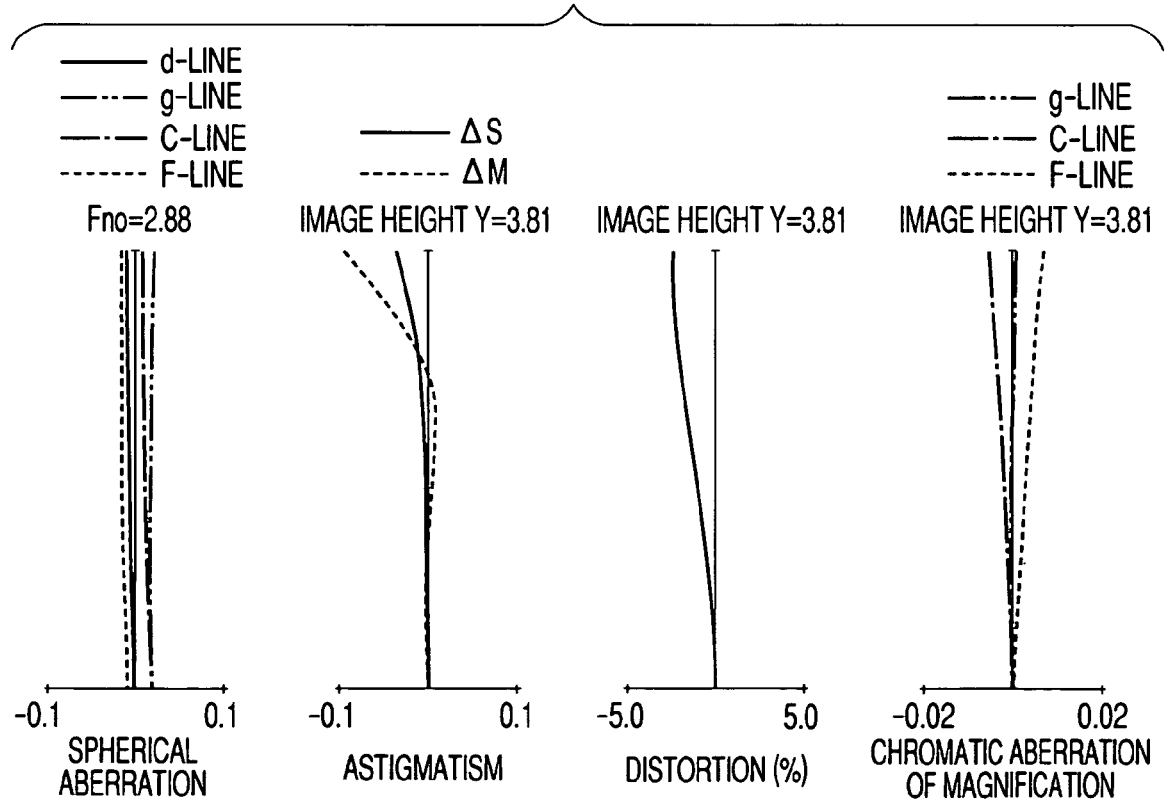
FIGS. 2A, 2B and 2C show various aberrations of the zoom lens according to Embodiment 1 of the present invention.
Figure 2B:
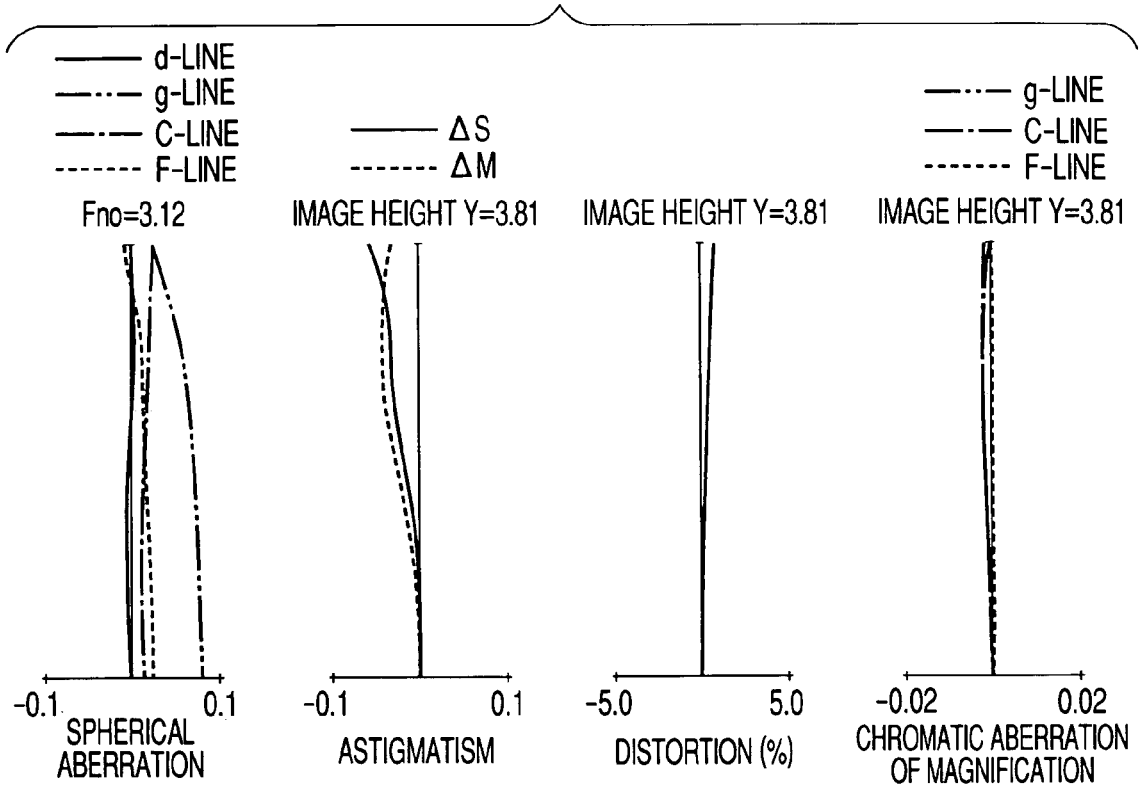
Figure 2C:
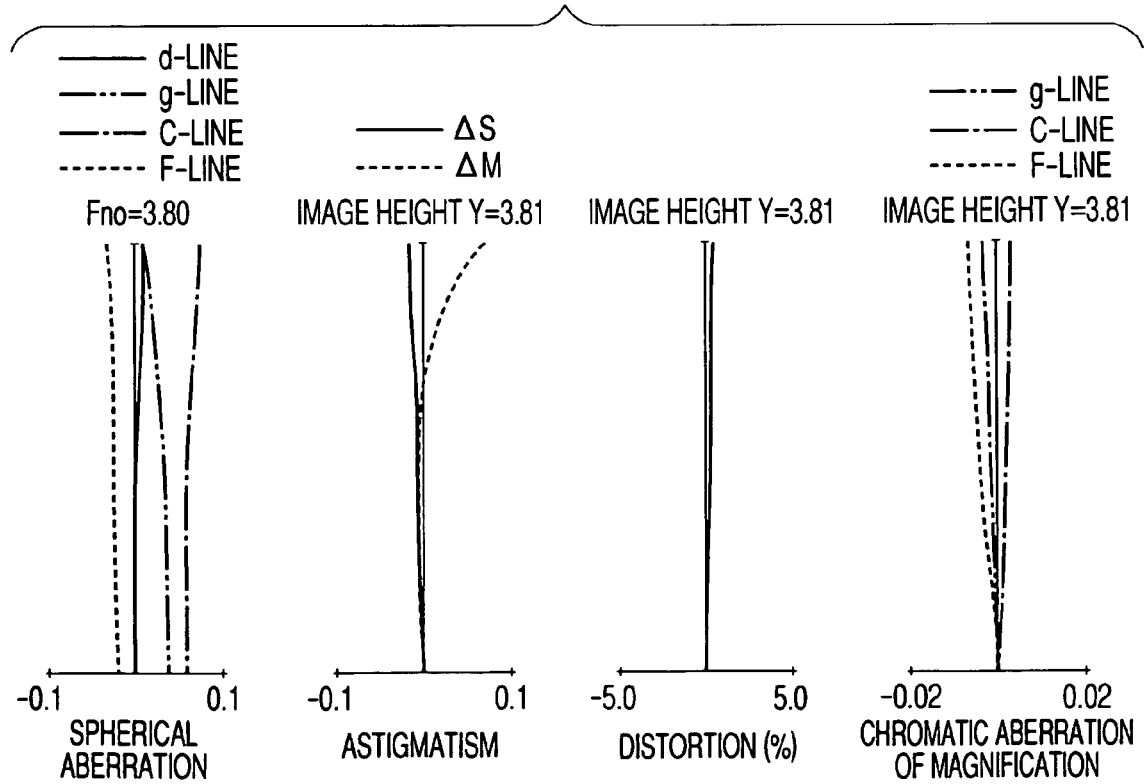
Figure 3:
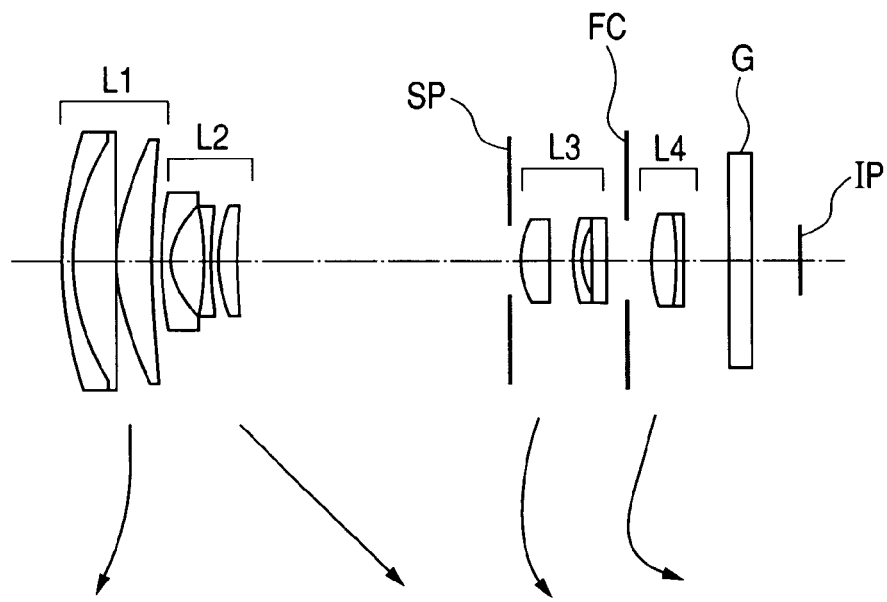
FIG. 3 is a cross-sectional view of a zoom lens according to Embodiment 2 of the present invention.
Figure 4A:
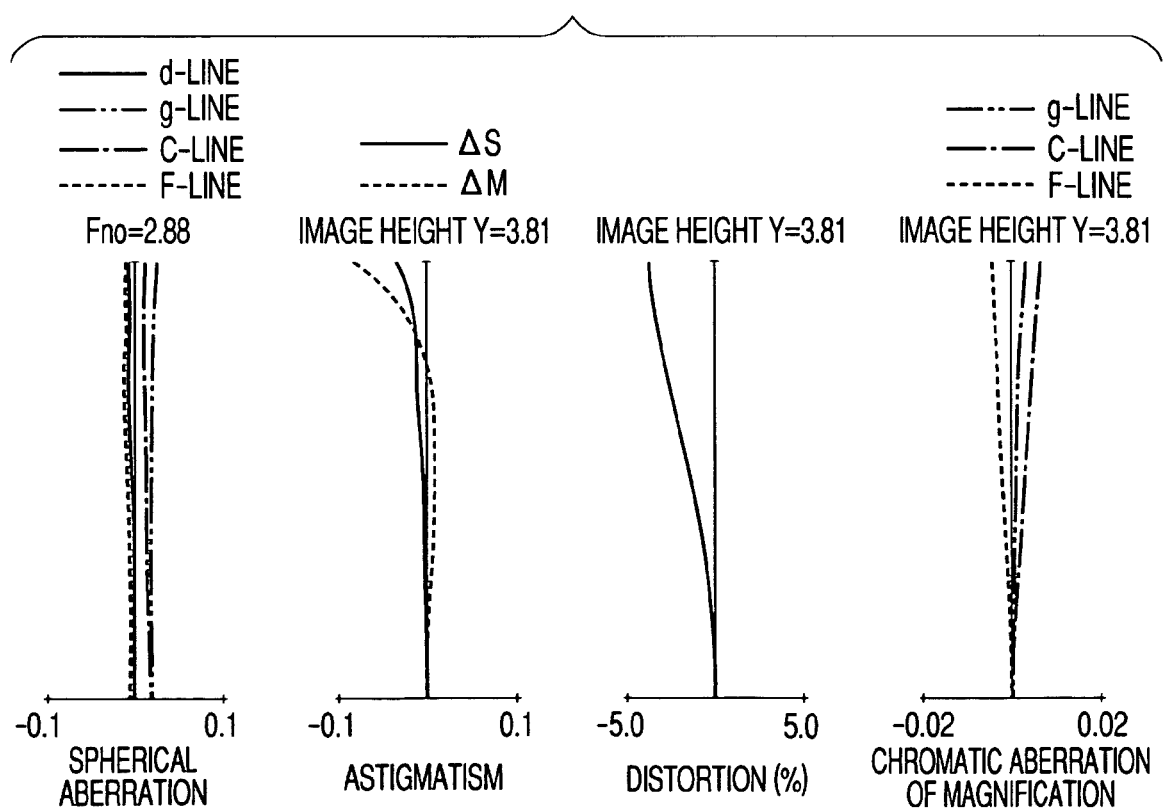
FIGS. 4A, 4B and 4C show various aberrations of the zoom lens according to Embodiment 2 of the present invention.
Figure 4B:
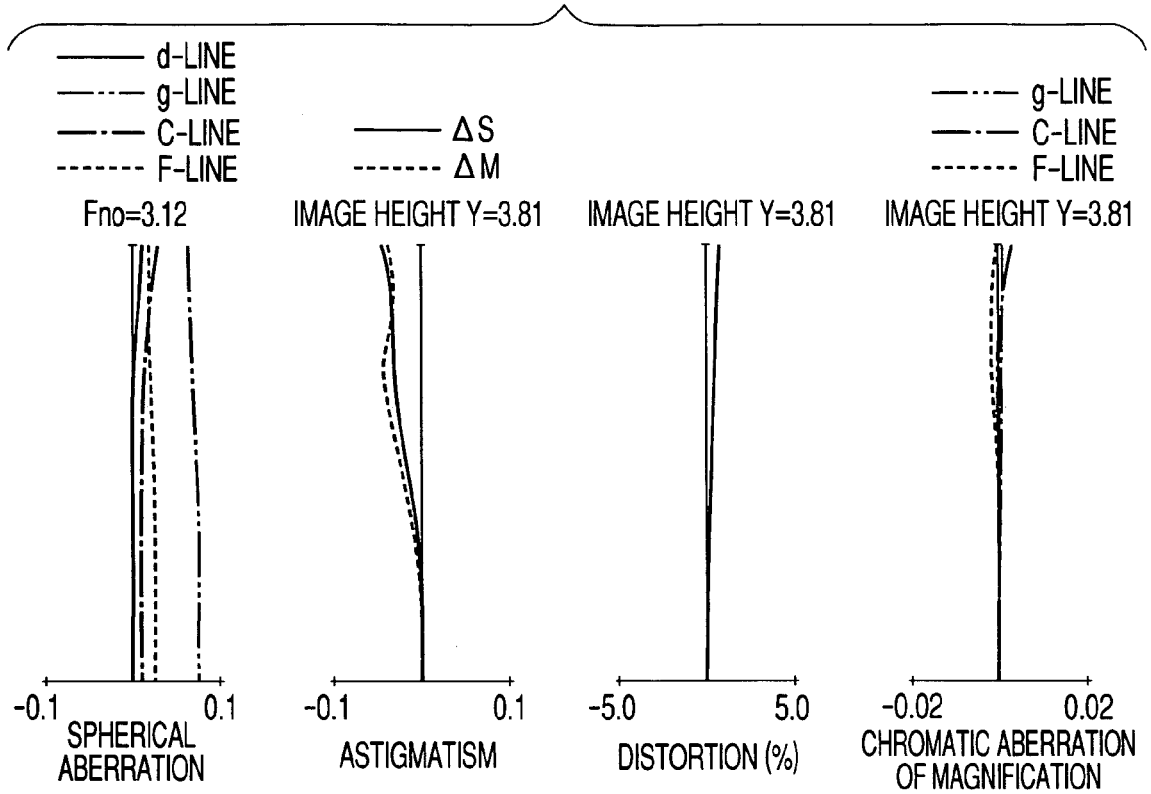
Figure 4C:
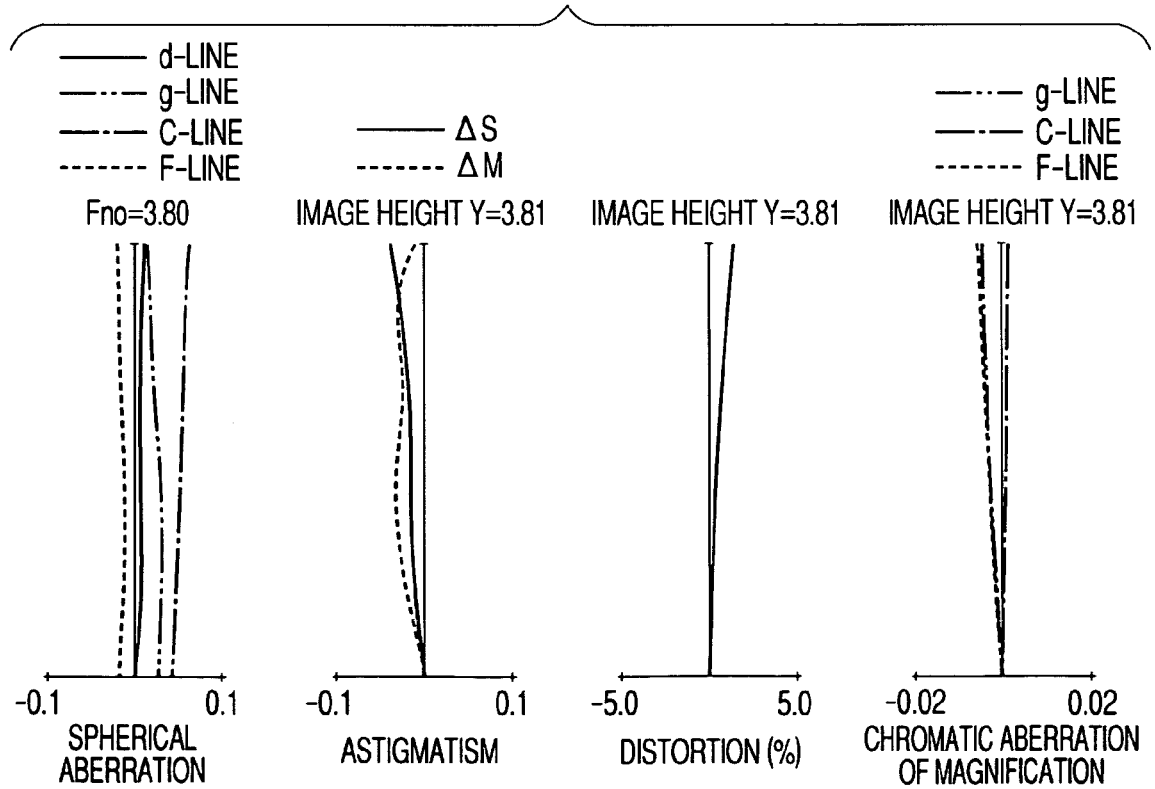
Figure 6B:
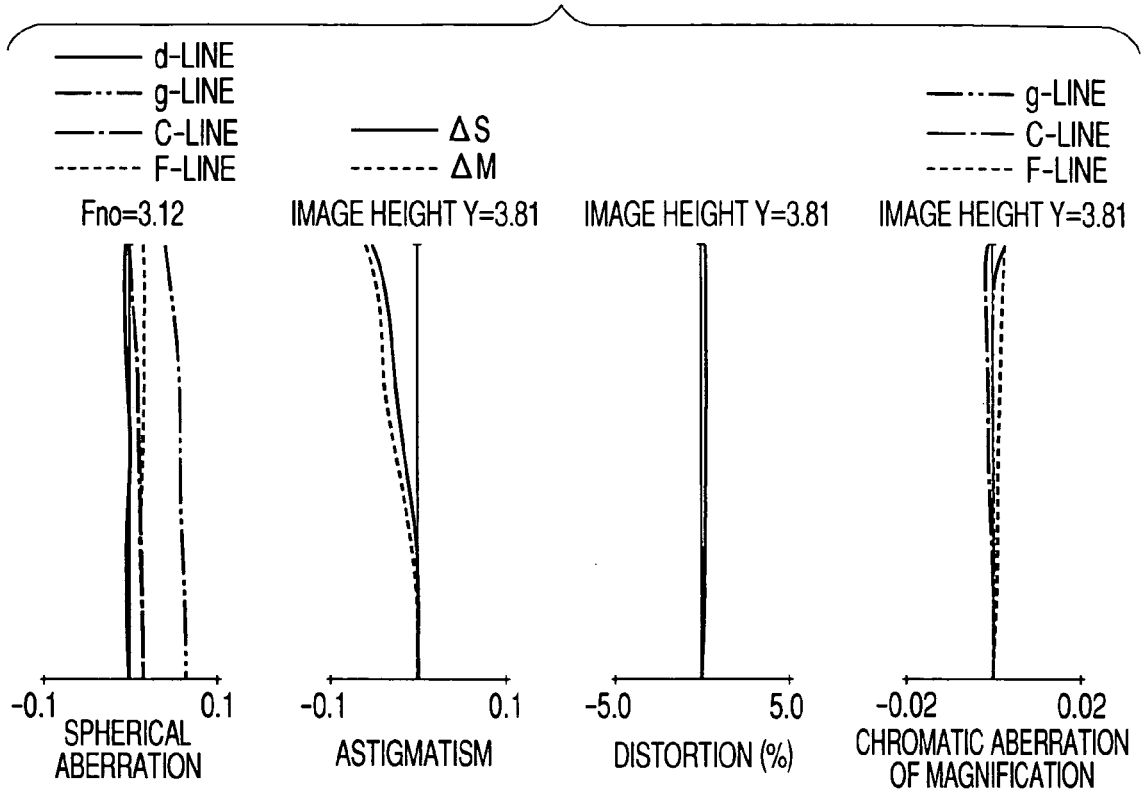
Figure 6C:
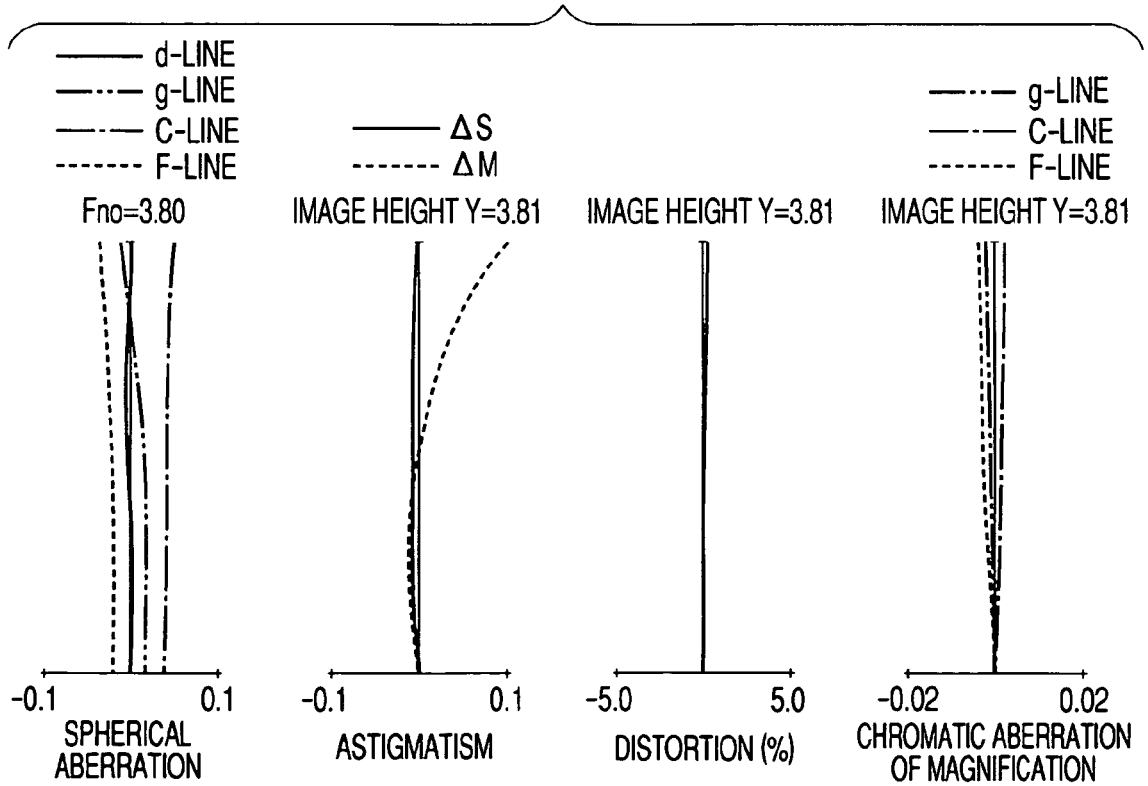

In the zoom lenses of Embodiments 1 to 3 shown in FIGS. 1, 3, and 5, during zooming from a wide angle end to a telephoto end, the first lens unit L1 moves to the object side so that the interval between the first lens unit L1 and the second lens unit L2 becomes large. The second lens unit L2 moves to the image side so that the interval between the second lens unit L2 and the aperture stop SP becomes small. The third lens unit L3 moves to the object along the locus convex to the object side so that the interval between the second lens unit L2 and the third lens unit L3 becomes small. Thus, main change in magnification is performed. The variation in the image plane involved in magnification is compensated by moving the fourth lens unit L4 along the locus convex to the object side.

Thus, in the zoom lenses of Embodiments 1 to 3, the first lens unit L1 moves during zooming, whereby the total length of the entire lens system at the wide angle end is shortened to realize miniaturization in the optical axis direction. Furthermore, the interval between the first lens unit L1 and the aperture stop SP is shortened at the wide angle end, whereby the effective diameter of the first lens unit L1 is suppressed from increasing to reduce the diameter of a front lens. Furthermore, during zooming from the wide angle end to the telephoto end, the third lens unit L3 moves to the object side, and the moved locus of the third lens unit L3 is set to enlarge the interval between the third lens unit L3 and the fourth lens unit L4, whereby the third lens unit L3 is partially allowed to change magnification. Because of this, the function of changing magnification by changing the interval between the first lens unit L1 and the second lens unit L2 is weakened, so that the interval between the first lens unit L1 and the second lens unit L2 at the telephoto end can be shortened. Consequently, there is a merit that the total length of the entire system at the telephoto end is shortened and the diameter of a front lens is reduced.

In Embodiments 1 to 3, the aperture stop SP moves integrally with the third lens unit L3 during zooming but may move separately. When they move integrally, the number of moving units can be reduced, which is likely to simplify the mechanical structure. On the other hand, in the case where the aperture stop SP by moving separately from the third lens unit L3, it is advantageous for reducing the diameter of a front lens by moving the aperture stop SP, in particular, along the locus convex to the object side.

Figure 7:
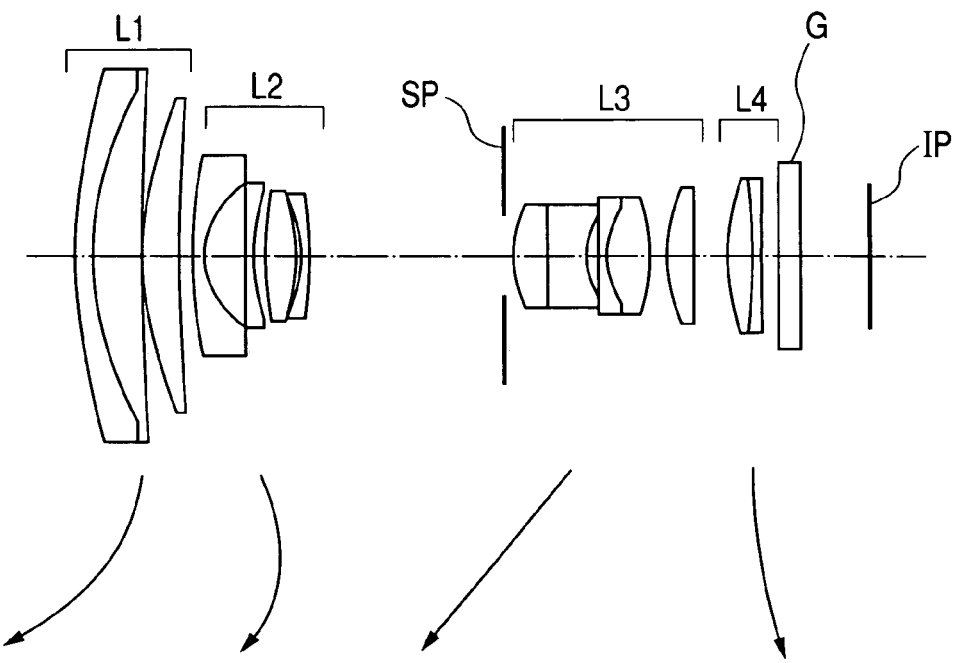
FIG. 7 is a cross-sectional view of a zoom lens according to Embodiment 4 of the present invention.
Figure 8A:
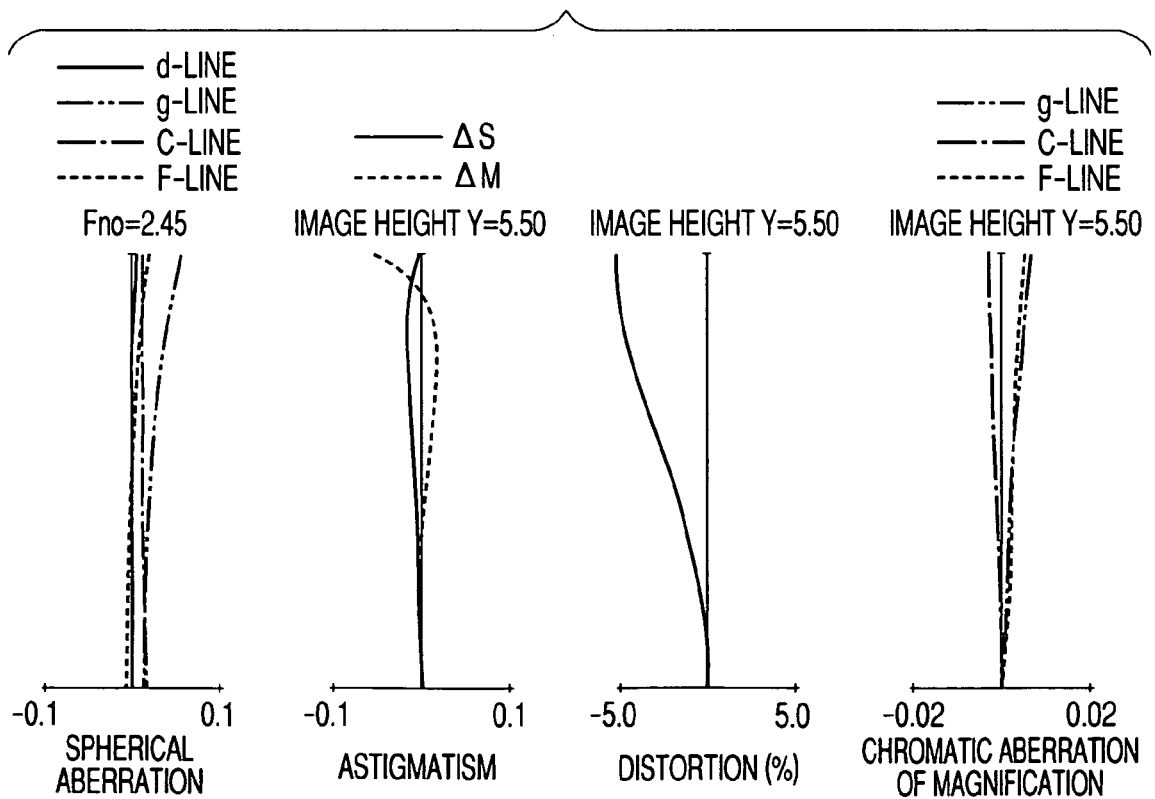
FIGS. 8A, 8B and 8C show various aberrations of the zoom lens according to Embodiment 4 of the present invention.
Figure 8B:
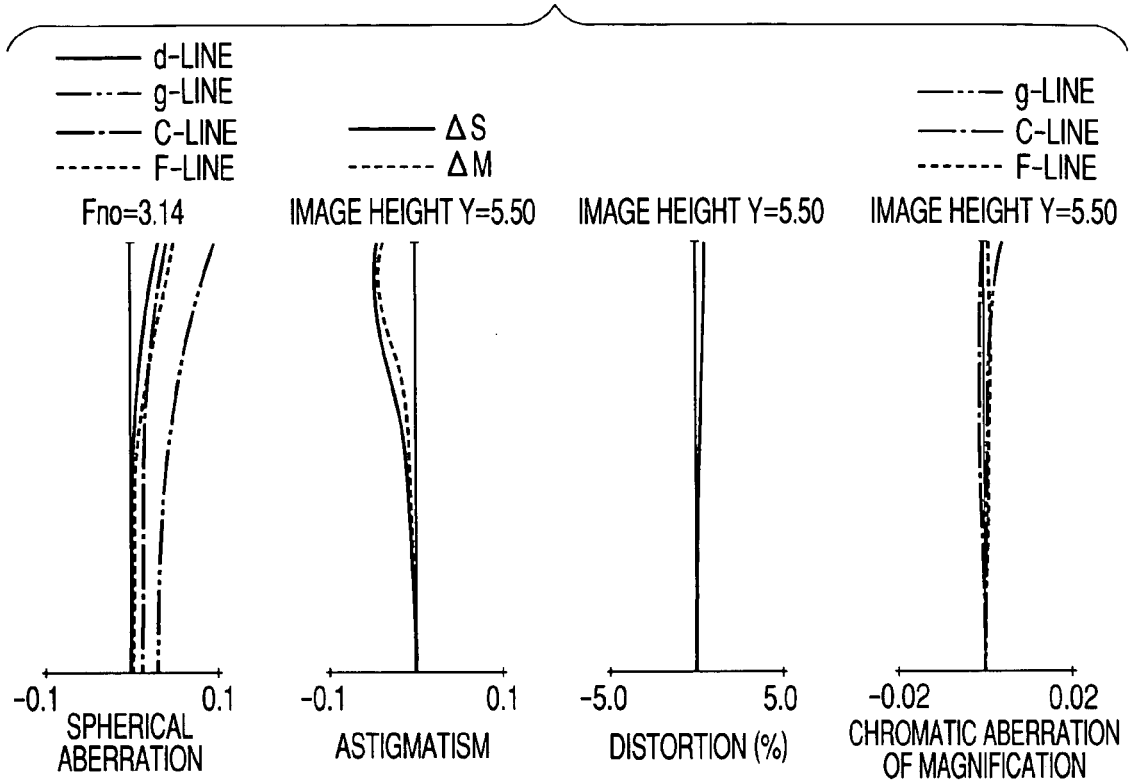
Figure 8C:
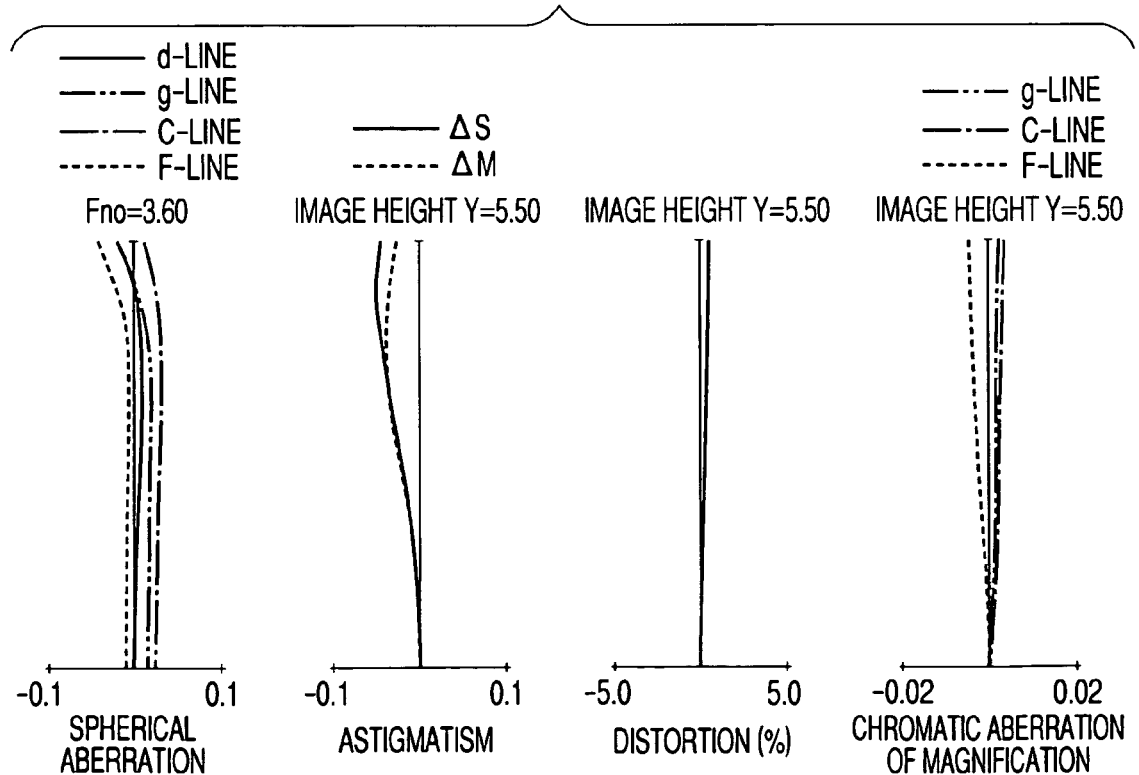
Figure 10B:
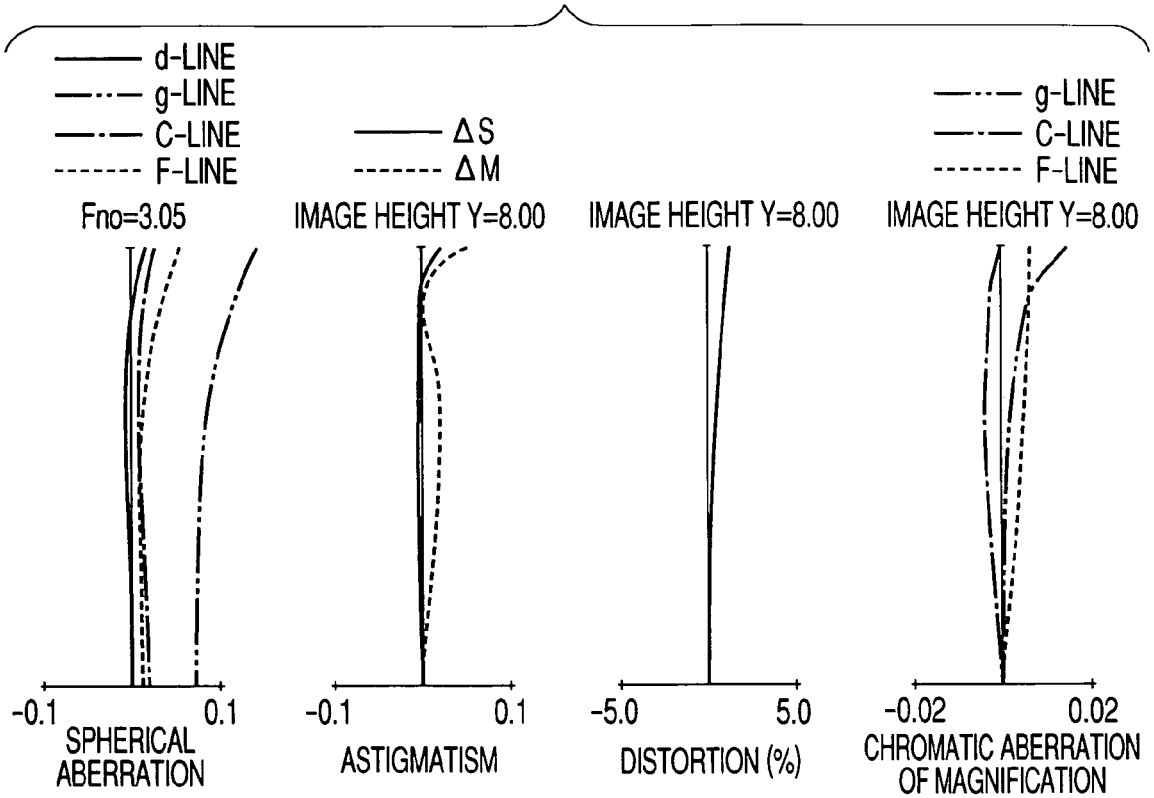
Figure 10C:
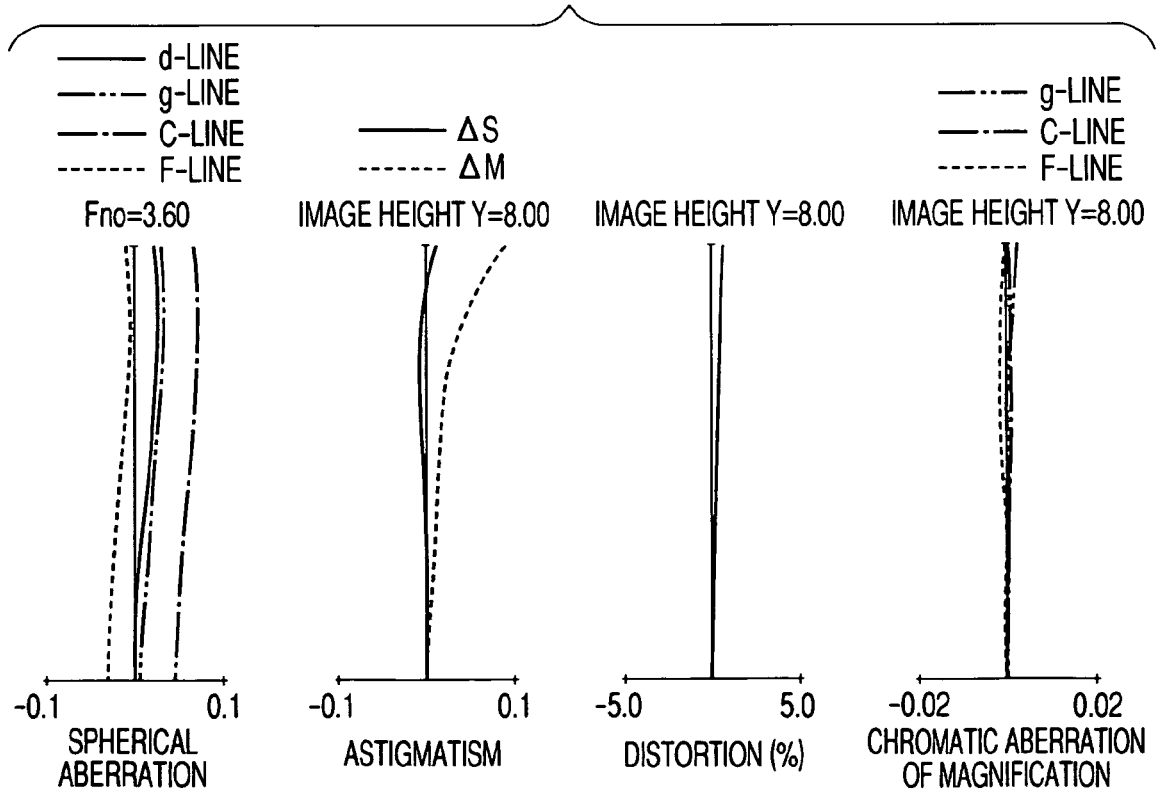

Embodiment 4 shown in FIG. 7 is the same as Embodiments 1 to 3 in the configuration of four lens units (positive, negative, positive, and positive), except a movement path of each lens unit during zooming. In Embodiment 4, during zooming from the wide angle end to the telephoto end, the distance by which the first lens unit L1 moves to the object side is long compared with Embodiments 1 to 3, and the second lens unit L2 substantially reciprocates on an optical axis while drawing a locus convex to the image side. Furthermore, during zooming from the wide angle end to the telephoto end, the third lens unit L3 moves monotonously to the object side.

Embodiment 5 shown in FIG. 9 is directed to the configuration of five lens units (positive, negative, positive, negative, and positive). During zooming from the wide angle end to the telephoto end, the first lens unit L1 moves to the object side, the second lens unit L2 moves to the image side, the third lens unit L3 moves to the object side, the fourth lens unit L4 moves to the image side, and the fifth lens unit L5 moves to the object side. The zoom lens of Embodiment 5 is designed as an image taking optical system for a camera in which a solid-state image pickup element is prepared for each color of RGB (Red, Green, Blue). Thus, a color separation prism is placed at the back of the fifth lens unit L5, so that the glass block G is thicker than that of the other embodiments, as including an equivalent optical length of the color separation prism.

Figure 11:
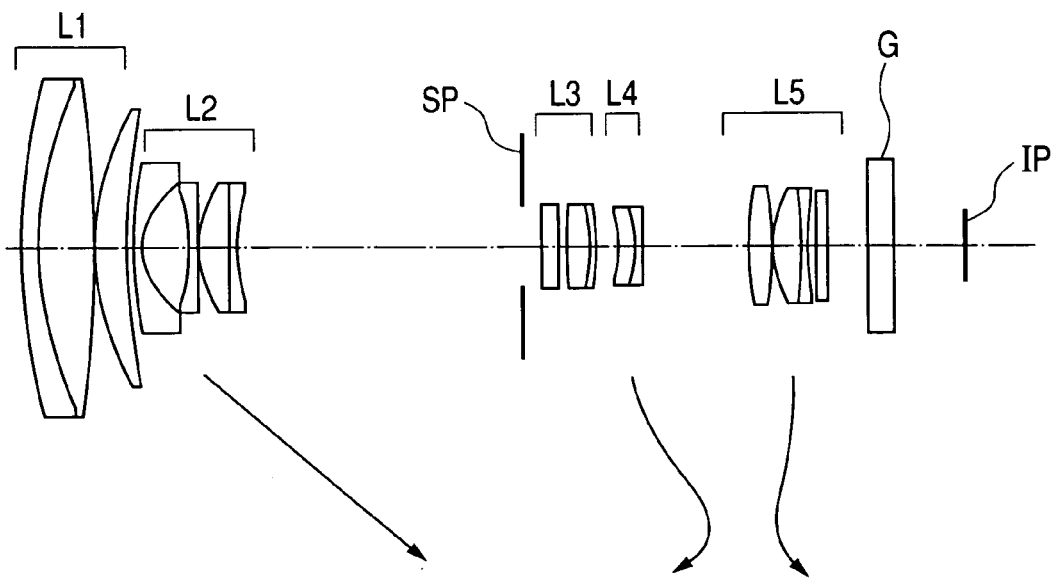
FIG. 11 is a cross-sectional view of a zoom lens according to Embodiment 6 of the present invention.
Figure 12A:
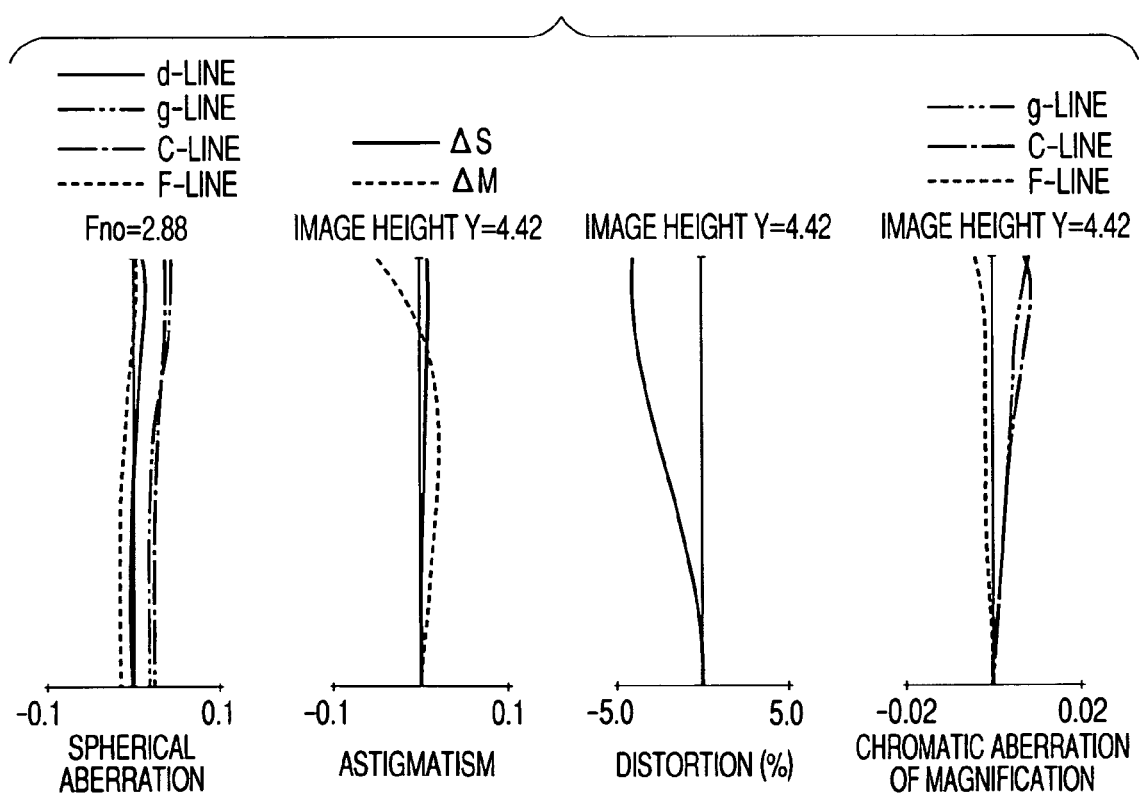

Embodiment 6 shown in FIG. 11 is the same as Embodiment 5 in the configuration of five lens units (positive, negative, positive, negative, and positive) except that the first lens unit L1 and the third lens unit L3 do not move during zooming.

The present invention is not limited to the movement system of the above-mentioned embodiments, and also includes a configuration in which the first lens unit and the third lens unit are fixed during zooming in the zoom lens of four units (positive, negative, positive, and positive).

Next, the configuration of the first lens unit L1 that is most characteristic in the present invention will be described.

In the zoom lens system of the present invention, a secondary spectrum on the telephoto side occurring in the first lens unit L1 is reduced by using a material having high dispersibility and anomalous dispersibility for a negative lens in the first lens unit L1. That is, the first lens unit of each embodiment includes at least one negative lens, and the negative lens is made of a material satisfying the following conditional formulas:

$$vd1n < 35 \quad (1)$$

$$\theta gF1n < -0.0027 vd1n + 0.680 \quad (2)$$

where vd1n represents an Abbe number of at least one negative lens in the first lens unit, and θgF1n represents a partial dispersion ratio of the negative lens. The Abbe number and the partial dispersion ratio θgF1n are defined by the following expressions:

$$vd = (Nd-1)/(NF-NC)$$

$$\theta gF = (Ng-NF)/(NF-NC)$$

where NC, Nd, NF, and Ng represent refractive indexes at a C-line, a d-line, an F-line, and a g-line.

According to the present invention, the primary achromatism and the correction of a secondary spectrum are both performed by allowing the first lens unit L1 to have a negative lens composed of a material satisfying the conditional formulas (1) and (2) simultaneously.

In each embodiment, the first lens unit L1 is composed of three lenses (negative lens, positive lens, and positive lens) in an order from the object side to the image side, and the negative lens closest to the object side and the second positive lens are set to be cemented lenses. By adopting a material satisfying the conditional formulas (1) and (2) for the negative lens closest to the object side, each achromatism of an axial chromatic aberration and a chromatic aberration of magnification and the correction of a spherical aberration are both performed while keeping a high zoom ratio and using a minimum required number of lens units. As the material satisfying the conditional formulas (1) and (2), S-LAH79 (Nd=2.00330, vd=28.3, θgF=0.598) produced by OHARA Inc. was used.

Figure 13:
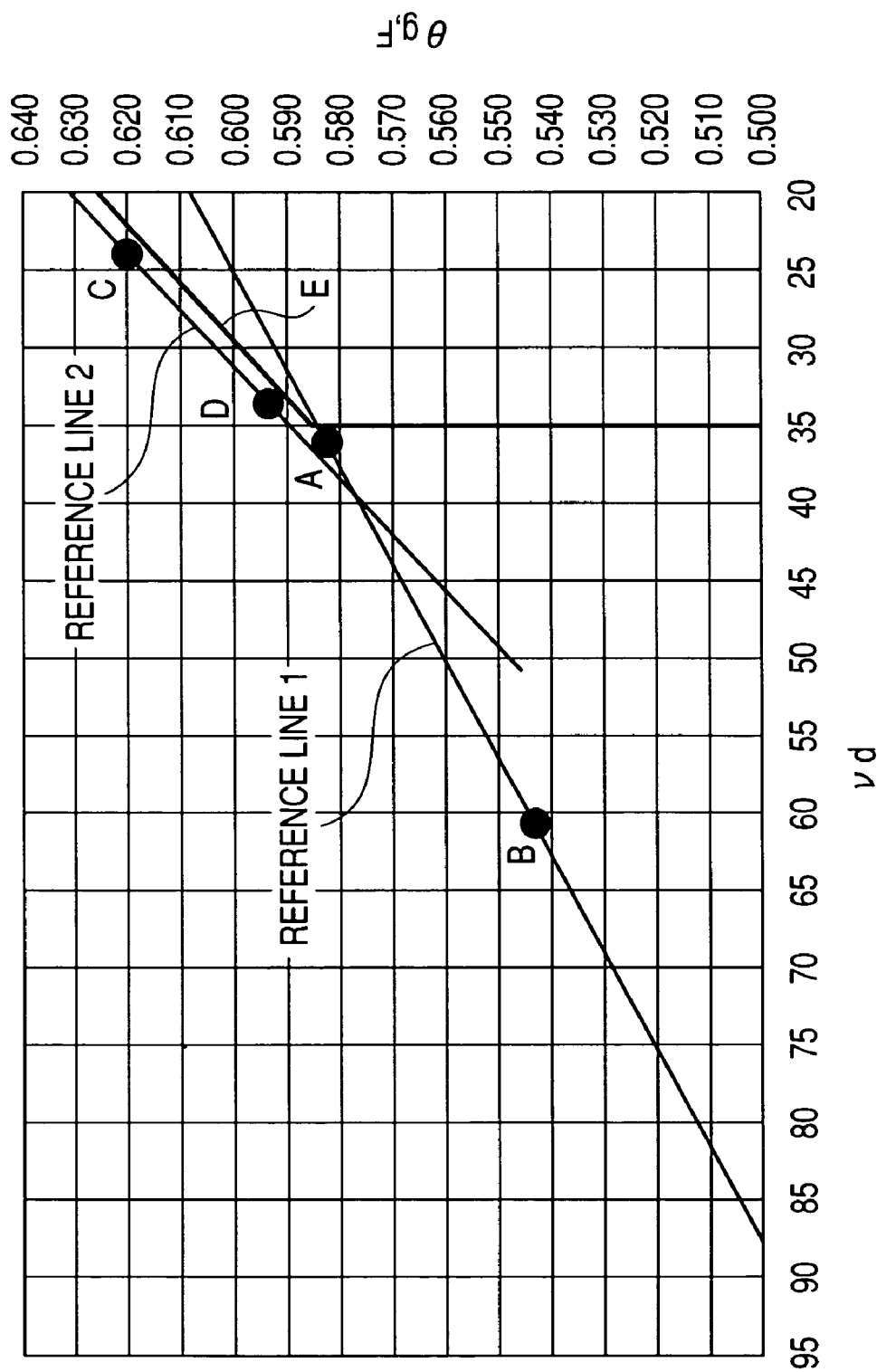
FIG. 13 is a graph showing a relationship between an Abbe number vd and a partial dispersion ratio θgF.

FIG. 13 is a graph showing a relationship between an Abbe number vd and a partial dispersion ratio θgF. In FIG. 13, A represents PBM2 (vd=36.26, θgF=0.5828) in OHARA Inc.; B represents NSL7 (vd=60.49, θgF=0.5436) in OHARA Inc.; C represents S-TIH53 (vd=23.8, θgF=0.621) in OHARA Inc.; and D represents S-TIM22 (vd=33.8, θgF=0.594) in OHARA Inc. When a line connecting A to B is a reference line 1, regarding the distribution of optical glass, high dispersion glass with vd smaller than about 35 is likely to be on an upper side of the reference line 1, low dispersion glass with vd of about 35 to 65 is likely to be on a lower side of the reference line 1, and anomalous dispersion glass with vd of 60 or more is positioned on an upper side of the reference line 1. However, in high dispersion glass with an Abbe number of smaller than 35, none of the glass is positioned on the lower side of the reference line 1 connecting A to B. When a line connecting C to D is a reference line 2 in high dispersion glass in FIG. 13, glass is positioned mostly in the vicinity of the reference line 2 at vd of 35 or less, and some glass is positioned on the lower side of the reference line 2. In particular, S-LAH79 is positioned on a lower side of the reference line 2, and hence has anomalous dispersibility as a high dispersion material. When a material having a small partial dispersion ratio in spite of high dispersion is used for the negative lens in the first lens unit L1, a secondary spectrum on the telephoto side can be reduced.

If the negative lens using anomalous dispersion glass is allowed to have a refracting power to some degree in the configuration of the first lens unit L1, even if the positive lens in the first lens unit L1 is not made of anomalous dispersion glass, a secondary spectrum can be reduced in a similar manner to that in the conventional configuration using anomalous dispersion glass only for the positive lens in the first lens unit L1. In this case, the positive lens in the first lens unit L1 may not be made of anomalous dispersion glass having a low refracting power. Therefore, the curvature can be small with respect to a desired refracting power (radius of curvature can be large) to make the positive lens thin, which leads to the miniaturization of the first lens unit L1.

Furthermore, when low dispersion glass (positioned on an upper side of the reference line 1 at vd of 60 or more in FIG. 13) having anomalous dispersion characteristics is used for the conventional positive lens in the first lens unit L1 as in the conventional example, it is needless to say that a secondary spectrum can be reduced further. Thus, by using glass having anomalous dispersibility for both the negative lens and the positive lens, the ability to correct a secondary spectrum can be enhanced compared with the conventional example. Consequently, the request performance of a secondary spectrum can be enhanced in accordance with an image pickup element with high resolution, and the focal length at the telephoto end is increased to enhance a zoom ratio.

The negative lens and the positive lens constituting the cemented lenses in the first lens unit L1 of Embodiment 2 are made of S-LAH79 and S-FPL51 produced by OHARA Inc. which are materials having anomalous dispersibility, whereby the correction force of a secondary spectrum is increased. The negative lens and the positive lens constituting the cemented lenses in the first lens unit L1 of Embodiment 3 are made of NBFD15 produced by HOYA Co. Ltd. and S-FPL51 produced by OHARA Inc. The negative lens and the positive lens constituting the cemented lenses in the first lens unit L1 of Embodiment 4 are made of S-LAH79 and S-LAL14 produced by OHARA Inc. The negative lens and the positive lens constituting the cemented lenses in the first lens unit L1 of Embodiment 5 are made of S-LAH79 and S-FSL5 produced by OHARA Inc. The negative lens and the positive lens constituting the cemented lenses in the first lens unit L1 of Embodiment 6 are made of S-LAH79 and S-FPL51 produced by OHARA Inc.

Herein, the technical meaning of the above-mentioned conditional formulas (1) and (2) will be described.

The conditional formula (1) defines an Abbe number of the negative lens in the first lens unit. When an Abbe number increases exceeding the upper limit of the conditional formula (1), dispersion becomes too small, which makes it difficult to correct a primary chromatic aberration occurring in the positive lens in the first lens unit L1. In order to perform primary achromatism without increasing the refracting power of the negative lens in the first lens unit L1 to an extreme extent, it is preferable to use a high dispersion material having an Abbe number in the range of the conditional formula (1).

The conditional formula (2) defines a partial dispersion ratio of the negative lens in the first lens unit L1. In FIG. 13, a line segment E satisfies $\theta gF1n=-0.0027vd1n+0.68$. The conditional formula (2) means to be positioned on a lower side of the line segment E in FIG. 13. The line segment E has the same slope as that of the reference line 2, and the material satisfying the conditional formula (2) has anomalous dispersibility to some degree with respect to the material in the vicinity of the reference line 2. A material having a partial dispersion ratio outside the range of the conditional formula (2) does not have anomalous dispersibility required for reducing a secondary spectrum.

Next, other conditions which the zoom lens of each Embodiment satisfies will be described.

When the focal length of the negative lens composed of a material satisfying the conditional formulas (1) and (2) in the first lens unit L1 is F1n, the focal length of the first lens unit L1 is f1, the focal length at the telephoto end of the entire system is ft, the focal length of the second lens unit L2 is f2, the focal length at the wide angle end of the entire system is fw, the Abbe number of the positive lens whose Abbe number is largest in the first lens unit L1 is vd1p, and the partial dispersion ratio is $\theta gF1p$, the following conditional formulas are satisfied.

$$1.0<|f1n|/f1<3.0 \quad (3)$$

$$0.5<f1/ft<2.5 \quad (4)$$

$$0.3<|f2|/(fw \times ft)-\frac{1}{2}<0.8 \quad (5)$$

$$-0.0024<(\theta gF1n-\theta gF1p)/(vd1n-vd1p) \quad (6)$$

The conditional formula (3) defines the focal length of the negative lens having high dispersion and anomalous dispersibility of the first lens unit L1. When the focal length of the negative lens having high dispersion and anomalous dispersibility becomes too long exceeding the upper limit, i.e., the refracting power of the negative lens becomes too weak, even when a high dispersion material is used, the primary chromatic aberration in the first lens unit L1 cannot be corrected sufficiently. When the focal length of the negative lens becomes too short exceeding the lower limit, i.e., the refracting power of the negative lens becomes too strong, a Petzval sum becomes large on the negative side, which may cause the distortion of an image surface.

The conditional formula (4) defines the focal length of the first lens unit L1. When the focal length of the first lens unit L1 becomes too long exceeding the upper limit, i.e., the refracting power of the first lens unit L1 becomes too weak, the total length of the entire system at the telephoto end becomes long, which is disadvantageous in terms of miniaturization. When the focal length of the first lens unit L1 becomes too short exceeding the lower limit, i.e., the refracting power of the first lens unit L1 becomes too strong, the occurrence of a spherical aberration becomes remarkable at the telephoto end.

The conditional formula (5) defines the focal length of the second lens unit L2. When the focal length of the second lens unit L2 becomes too long exceeding the upper limit, i.e., the refracting power of the second lens unit L2 becomes too weak, the moving amount of the second lens unit L2 for keeping a desired zoom ratio becomes large to enlarge the full length of the entire system at the wide angle end, which is disadvantageous in terms of miniaturization. When the focal length of the second lens unit L2 becomes too short exceeding the lower limit, i.e., the refracting power of the second lens unit L2 becomes too strong, a Petzval sum becomes large on the negative side, which may cause the distortion of an image surface.

The conditional formula (6) defines the relationship of a partial dispersion ratio of the negative lens and the positive lens in the first lens unit L1. In the conditional formula (6), $(\theta gF1n-\theta gF1p)/(vd1n-vd1p)$ represents a slope of a line segment connecting the corresponding points based on the Abbe number and the partial dispersion ratio of the negative lens and the positive lens in the first lens unit L1 in FIG. 13. As the slope is smaller, a secondary spectrum is reduced more. When the slope becomes too large exceeding the lower limit, even if the material satisfying the conditional formulas (1) and (2) is used for the negative lens, it is difficult to reduce a secondary spectrum. Thus, it is preferable that the positive lens satisfies the conditional formula (6) under the condition that the negative lens satisfies the conditional formulas (1) and (2).

Furthermore, it is preferable that the negative lens composed of a material satisfying the conditional formulas (1) and (2) of the first lens unit satisfies the following conditional formula:

$$1.80<N1n \quad (7)$$

where N1n is a refractive index of the negative lens.

The conditional formula (7) defines the refractive index of the negative lens of the first lens unit L1. In the case where the refracting power of the negative lens in the first lens unit L1 satisfies the conditional formula (3), when the refractive index becomes too small exceeding the lower limit of the conditional formula (7), a Petzval sum becomes large on the negative side, which may cause the distortion of an image surface.

Furthermore, among the above-mentioned conditional formulas, the conditional formulas (2) and (7) are preferably set to be in the following ranges.

$$\theta gF1n<-0.0027vd1n+0.676 \quad (2a)$$

$$1.85<N1n \quad (7a)$$

The conditional formula (2a) is obtained by changing a constant term of the conditional formula (2), and further away from the reference line 2 in FIG. 13. The negative lens in the first lens unit L1 is limited to a material having higher anomalous dispersibility for satisfying such a condition, so that the effect of reducing a secondary spectrum is enhanced.

The conditional formula (7a) is obtained by further limiting the conditional formula (7) to a high refractive index side, which further reduces the distortion of an image surface to provide flat image surface characteristics.

Next, numerical data of Numerical Embodiments 1 to 6 corresponding to Embodiments 1 to 6 will be shown. In the numerical embodiments, f denotes a focal length, Fno denotes an F-number, ω denotes a half angle of view, i denotes an order counted from the object side, Ri denotes a radius of curvature of the i-th plane, Di denotes an axial interval between the i-th surface and the (i+1)th surface and Ni, vi, $\theta gFi$ denote a refractive index, an Abbe number, and a partial dispersion ratio based on a d-line of the i-th material, respectively. Regarding $\theta gFi$, only a lens forming the first lens unit will be shown.

When the traveling direction of light is positive, x represents a displacement amount from a surface apex in an optical axis direction, h represents a height from an optical axis in a direction vertical to an optical axis, R represents a paraxial radius of curvature, k represents a conic constant, and B to E and A' to D' represent aspherical coefficients, respectively, the aspherical shape is represented by the following formula:

$$x = \frac{(1/R)h^2}{1 + \sqrt{\{1-(1+k)(h/R)^2\}}} + Bh^4 + Ch^6 + Dh^8 + Eh^{10} + A'h^3 + B'h^5 + C'h^7 + D'h^9$$

Table 1 shows the relationship between the above-mentioned respective conditional formulas and the numerical embodiments.

(Numerical Embodiment 1)

f = 6.74 to 64.80  Fno = 2.88 to 3.80  2ω = 52.9° to 5.9°

| R1 = 45.818 | D1 = 1.30 | N1 = 2.003300 | ν1 = 28.3 |
|---|---|---|---|
| R2 = 26.799 | D2 = 4.30 | N2 = 1.487490 | ν2 = 70.2 |
| R3 = 165.297 | D3 = 0.20 | | |
| R4 = 27.523 | D4 = 3.70 | N3 = 1.696797 | ν3 = 55.5 |
| R5 = 144.903 | D5 = Variable | | |
| R6 = 40.613 | D6 = 0.80 | N4 = 1.834000 | ν4 = 37.2 |
| R7 = 7.384 | D7 = 3.68 | | |
| R8 = −30.183 | D8 = 0.70 | N5 = 1.772499 | ν5 = 49.6 |
| R9 = 23.730 | D9 = 0.86 | | |
| R10 = 15.820 | D10 = 1.90 | N6 = 1.922860 | ν6 = 18.9 |
| R11 = 69.378 | D11 = Variable | | |
| R12 = Stop | D12 = 1.04 | | |
| R13 = 9.532 | D13 = 3.00 | N7 = 1.583126 | ν7 = 59.4 |
| R14 = 284.452 | D14 = 2.60 | | |
| R15 = 15.350 | D15 = 0.70 | N8 = 1.846660 | ν8 = 23.9 |
| R16 = 8.422 | D16 = 1.10 | | |
| R17 = 48.546 | D17 = 1.60 | N9 = 1.487490 | ν9 = 70.2 |
| R18 = −39.980 | D18 = 2.30 | | |
| R19 = Flare-cut | D19 = Variable | | |
| R20 = 17.765 | D20 = 2.70 | N10 = 1.696797 | ν10 = 55.5 |
| R21 = −28.648 | D21 = 0.70 | N11 = 1.846660 | ν11 = 23.9 |
| R22 = −887.256 | D22 = Variable | | |
| R23 = ∞ | D23 = 2.60 | N12 = 1.516330 | ν12 = 64.1 |
| R24 = ∞ | | | |

| | Focal Length | | |
|---|---|---|---|
| Variable Interval | 6.74 | 26.63 | 64.80 |
| D5 | 0.92 | 17.65 | 26.63 |
| D11 | 27.64 | 8.41 | 1.93 |
| D19 | 1.45 | 0.27 | 6.14 |
| D22 | 5.00 | 10.27 | 3.75 |

Aspherical Coefficients
Thirteenth Surface k = 9.08580e−02
B = −1.25669e−05   C = 2.05092e−05   D = 2.02174e−07
E = −3.51672e−10
A' = −6.80016e−05  B' = −6.92855e−05  C' = −3.27871E−06
D' = 0
θgF1 = 0.598   θgF2 = 0.530   θgF3 = 0.543

(Numerical Embodiment 2)

f = 6.74 to 64.80  Fno = 2.88 to 3.80  2ω = 52.9° to 5.9°

| R1 = 45.907 | D1 = 1.40 | N1 = 2.003300 | ν1 = 28.3 |
|---|---|---|---|
| R2 = 27.592 | D2 = 5.00 | N2 = 1.496999 | ν2 = 81.5 |
| R3 = 60726.963 | D3 = 0.20 | | |
| R4 = 27.979 | D4 = 3.90 | N3 = 1.696797 | ν3 = 55.5 |
| R5 = 147.199 | D5 = Variable | | |
| R6 = 69.486 | D6 = 0.80 | N4 = 1.834000 | ν4 = 37.2 |
| R7 = 7.835 | D7 = 3.38 | | |
| R8 = −30.481 | D8 = 0.70 | N5 = 1.772499 | ν5 = 49.6 |
| R9 = 24.130 | D9 = 0.86 | | |
| R10 = 16.616 | D10 = 1.90 | N6 = 1.922860 | ν6 = 18.9 |
| R11 = 93.556 | D11 = Variable | | |
| R12 = Stop | D12 = 1.04 | | |
| R13 = 9.526 | D13 = 3.00 | N7 = 1.583126 | ν7 = 59.4 |
| R14 = 329.095 | D14 = 2.60 | | |
| R15 = 15.349 | D15 = 0.70 | N8 = 1.846660 | ν8 = 23.9 |
| R16 = 8.420 | D16 = 1.10 | | |
| R17 = 42.813 | D17 = 1.60 | N9 = 1.487490 | ν9 = 70.2 |
| R18 = −37.289 | D18 = 2.30 | | |
| R19 = Flare-cut | D19 = Variable | | |
| R20 = 15.846 | D20 = 2.70 | N10 = 1.696797 | ν10 = 55.5 |
| R21 = −32.767 | D21 = 0.70 | N11 = 1.846660 | ν11 = 23.9 |
| R22 = 128.024 | D22 = Variable | | |
| R23 = ∞ | D23 = 2.60 | N12 = 1.516330 | ν12 = 64.1 |
| R24 = ∞ | | | |

| | Focal Length | | |
|---|---|---|---|
| Variable Interval | 6.74 | 25.05 | 64.80 |
| D5 | 0.92 | 16.76 | 25.32 |
| D11 | 28.66 | 10.32 | 4.26 |
| D19 | 3.03 | 2.94 | 9.91 |
| D22 | 5.00 | 9.18 | 1.56 |

Aspherical Coefficients
Thirteenth Surface k = 7.37802e−02
B = −2.21673e−06   C = 1.96441e−05   D = 2.46908e−07
E = −8.17943e−10
A' = −8.95231e−05  B' = −6.71741e−05  C' = −3.38043E−06
D' = 0
θgF1 = 0.598   θgF2 = 0.538   θgF3 = 0.543

(Numerical Embodiment 3)

f = 6.73 to 64.88  Fno = 2.88 to 3.80  2ω = 52.9° to 5.9°

| R1 = 62.074 | D1 = 1.40 | N1 = 1.806100 | ν1 = 33.3 |
|---|---|---|---|
| R2 = 26.099 | D2 = 5.00 | N2 = 1.496999 | ν2 = 81.5 |
| R3 = 8344.037 | D3 = 0.20 | | |
| R4 = 28.137 | D4 = 3.90 | N3 = 1.696797 | ν3 = 55.5 |
| R5 = 166.588 | D5 = Variable | | |
| R6 = 54.369 | D6 = 0.80 | N4 = 1.834000 | ν4 = 37.2 |
| R7 = 7.774 | D7 = 3.42 | | |
| R8 = −31.133 | D8 = 0.70 | N5 = 1.772499 | ν5 = 49.6 |
| R9 = 27.337 | D9 = 0.86 | | |
| R10 = 16.657 | D10 = 1.90 | N6 = 1.922860 | ν6 = 18.9 |
| R11 = 78.428 | D11 = Variable | | |
| R12 = Stop | D12 = 1.04 | | |
| R13 = 9.807 | D13 = 3.00 | N7 = 1.583126 | ν7 = 59.4 |
| R14 = 104.757 | D14 = 2.60 | | |
| R15 = 13.373 | D15 = 0.70 | N8 = 1.846660 | ν8 = 23.9 |
| R16 = 8.401 | D16 = 1.10 | | |
| R17 = 75.057 | D17 = 1.60 | N9 = 1.487490 | ν9 = 70.2 |
| R18 = −39.378 | D18 = 2.30 | | |
| R19 = Flare-cut | D19 = Variable | | |
| R20 = 17.525 | D20 = 2.70 | N10 = 1.696797 | ν10 = 55.5 |
| R21 = −23.817 | D21 = 0.70 | N11 = 1.846660 | ν11 = 23.9 |
| R22 = −1527.617 | D22 = Variable | | |

-continued (Numerical Embodiment 3)

| R23 = ∞ | D23 = 2.60 | N12 = 1.516330 | ν12 = 64.1 |
|---|---|---|---|
| R24 = ∞ | | | |

Focal Length

| Variable Interval | 6.73 | 26.76 | 64.88 |
|---|---|---|---|
| D5 | 0.92 | 18.84 | 28.38 |
| D11 | 29.34 | 8.92 | 1.88 |
| D19 | 1.93 | 0.61 | 5.91 |
| D22 | 5.00 | 10.41 | 4.46 |

Aspherical Coefficients
Thirteenth Surface k = 2.31845e−01
B = 2.00369e−05    C = 1.608537e−05    D = 4.05874e−07
E = −3.07187e−09
A' −6.48963e−05    B' = −4.81856e−05    C' = −3.57450E−06
D' = 0
θgF1 = 0.588    θgF2 = 0.538    θgF3 = 0.543

(Numerical Embodiment 4)

f = 7.40 to 49.93 Fno = 2.45 to 3.60 2ω = 74.2° to 12.8°

| R1 = 69.953 | D1 = 1.80 | N1 = 2.003300 | ν1 = 28.3 |
|---|---|---|---|
| R2 = 38.458 | D2 = 5.40 | N2 = 1.696797 | ν2 = 55.5 |
| R3 = 240.106 | D3 = 0.20 | | |
| R4 = 42.228 | D4 = 4.00 | N3 = 1.603112 | ν3 = 60.6 |
| R5 = 213.904 | D5 = Variable | | |
| R6 = 65.018 | D6 = 1.10 | N4 = 1.772499 | ν4 = 49.6 |
| R7 = 9.570 | D7 = 4.51 | | |
| R8 = −92.182 | D8 = 0.90 | N5 = 1.712995 | ν5 = 53.9 |
| R9 = 20.596 | D9 = 1.41 | | |
| R10 = 34.712 | D10 = 3.30 | N6 = 1.846660 | ν6 = 23.9 |
| R11 = −24.754 | D11 = 0.42 | | |
| R12 = −16.223 | D12 = 0.80 | N7 = 1.882997 | ν7 = 40.8 |
| R13 = −52.307 | D13 = Variable | | |
| R14 = Stop | D14 = 0.80 | | |
| R15 = 10.752 | D15 = 4.00 | N8 = 1.743300 | ν8 = 49.3 |
| R16 = −1517.334 | D16 = 4.00 | N9 = 1.647689 | ν9 = 33.8 |
| R17 = 9.583 | D17 = 1.43 | | |
| R18 = 67.785 | D18 = 0.80 | N10 = 1.603420 | ν10 = 38.0 |
| R19 = 10.688 | D19 = 4.60 | N11 = 1.496999 | ν11 = 81.5 |
| R20 = −26.644 | D20 = 2.00 | | |
| R21 = 18.138 | D21 = 3.00 | N12 = 1.433870 | ν12 = 95.1 |
| R22 = −148.961 | D22 = Variable | | |
| R23 = 23.486 | D23 = 2.80 | N13 = 1.772499 | ν13 = 49.6 |
| R24 = −61.733 | D24 = 0.90 | N14 = 1.846660 | ν14 = 23.9 |
| R25 = 160.586 | D25 = 2.00 | | |
| R26 = ∞ | D26 = 2.40 | N15 = 1.516330 | ν15 = 64.1 |
| R27 = ∞ | | | |

Focal Length

| Variable Interval | 7.40 | 24.23 | 49.93 |
|---|---|---|---|
| D5 | 1.50 | 22.11 | 33.24 |
| D13 | 21.74 | 7.07 | 2.62 |
| D22 | 3.68 | 18.43 | 27.59 |

Aspherical Coefficients

Tenth Surface k = −5.22197e+00
B = 6.2067e−05    C = −2.94467e−07    D = −2.08546e−09
E = 1.581298e−10
A' = 0 B' = 0 C' = 0 D' = 0

Eleventh surface

-continued (Numerical Embodiment 4)

k = 1.69413e+00
B = −5.28431e−06    C = −2.59025e−07    D = −1.09156e−08
E = −2.01132e−12
A' = 0 B' = 0 C' = 0 D' = 0

Fifteenth Surface k = −4.58147e−01
B = −1.97178e−05    C = 3.87206e−08    D = 0.00000e+00
E = 0.00000e+00
A' = 0 B' = 0 C' = 0 D' = 0
θgF1 = 0.598    θgF2 = 0.543    θgF3 = 0.542

(Numerical Embodiment 5)

f = 10.70 to 52.00 Fno = 2.47 to 3.60 2ω = 73.6° to 17.5°

| R1 = 86.597 | D1 = 2.20 | N1 = 2.003300 | ν1 = 28.3 |
|---|---|---|---|
| R2 = 60.933 | D2 = 8.00 | N2 = 1.487490 | ν2 = 70.2 |
| R3 = 575.874 | D3 = 0.20 | | |
| R4 = 57.564 | D4 = 5.00 | N3 = 1.696797 | ν3 = 55.5 |
| R5 = 152.745 | D5 = Variable | | |
| R6 = 69.553 | D6 = 1.50 | N4 = 1.743997 | ν4 = 44.8 |
| R7 = 12.681 | D7 = 7.70 | | |
| R8 = −87.086 | D8 = 1.20 | N5 = 1.712995 | ν5 = 53.9 |
| R9 = 31.485 | D9 = 0.20 | | |
| R10 = 19.959 | D10 = 4.80 | N6 = 1.805181 | ν6 = 25.4 |
| R11 = 205.190 | D11 = 0.70 | | |
| R12 = −189.317 | D12 = 1.05 | N7 = 1.603420 | ν7 = 38.0 |
| R13 = 46.681 | D13 = Variable | | |
| R14 = Stop | D14 = 1.40 | | |
| R15 = −25.412 | D15 = 0.70 | N8 = 1.800999 | ν8 = 35.0 |
| R16 = 21.168 | D16 = 3.80 | N9 = 1.693501 | ν9 = 53.2 |
| R17 = −21.644 | D17 = 0.12 | | |
| R18 = 40.587 | D18 = 3.20 | N10 = 1.719995 | ν10 = 50.2 |
| R19 = −49.292 | D19 = Variable | | |
| R20 = −31.010 | D20 = 2.05 | N11 = 1.846660 | ν11 = 23.9 |
| R21 = −16.841 | D21 = 0.75 | N12 = 1.638539 | ν12 = 55.4 |
| R22 = −4955.327 | D22 = Variable | | |
| R23 = −200.777 | D23 = 3.00 | N13 = 1.583126 | ν13 = 59.4 |
| R24 = −43.989 | D24 = 1.40 | | |
| R25 = −29.407 | D25 = 1.10 | N14 = 1.846660 | ν14 = 23.9 |
| R26 = −880.863 | D26 = 5.40 | N15 = 1.516330 | ν15 = 64.1 |
| R27 = −25.603 | D27 = 0.20 | | |
| R28 = 92.993 | D28 = 5.60 | N16 = 1.438750 | ν16 = 95.0 |
| R29 = −36.192 | D29 = 0.20 | | |
| R30 = 98.165 | D30 = 3.80 | N17 = 1.438750 | ν17 = 95.0 |
| R31 = −88.335 | D31 = 2.00 | | |
| R32 = ∞ | D32 = 30.00 | N18 = 1.516330 | ν18 = 64.1 |
| R33 = ∞ | | | |

Focal Length

| Variable Interval | 10.70 | 24.64 | 52.00 |
|---|---|---|---|
| D5 | 1.30 | 26.39 | 44.92 |
| D13 | 31.71 | 13.20 | 3.63 |
| D19 | 2.41 | 13.01 | 24.00 |
| D22 | 23.75 | 13.15 | 2.16 |

Aspherical Coefficients
Twenty-third Surface k = 1.65286e+02
B = −1.15849e−05    C = 7.11620e−09    D = −6.41580e−11
E = 3.01107e−13
A' = 0 B' = 0 C' = D = 0
θgF1 = 0.598    θgF2 = 0.530    θ= 0.543

(Numerical Embodiment 6)

f = 7.41 to 72.52  Fno = 2.88 to 3.58  2ω = 63.1° to 7.2°

| | | | |
|---|---|---|---|
| R1 = 82.056 | D1 = 1.80 | N1 = 2.003300 | ν1 = 28.3 |
| R2 = 44.777 | D2 = 7.00 | N2 = 1.496999 | ν2 = 81.5 |
| R3 = −135.275 | D3 = 0.20 | | |
| R4 = 33.670 | D4 = 3.90 | N3 = 1.696797 | ν3 = 55.5 |
| R5 = 84.120 | D5 = Variable | | |
| R6 = 66.631 | D6 = 1.00 | N4 = 1.834807 | ν4 = 42.7 |
| R7 = 9.527 | D7 = 5.70 | | |
| R8 = −29.340 | D8 = 0.85 | N5 = 1.693501 | ν5 = 53.2 |
| R9 = −2211.790 | D9 = 0.55 | | |
| R10 = 16.193 | D10 = 3.50 | N6 = 1.846660 | ν6 = 23.8 |
| R11 = −1439.057 | D11 = 0.75 | N7 = 1.834807 | ν7 = 42.7 |
| R12 = 22.440 | D12 = Variable | | |
| R13 = Stop | D13 = 2.30 | | |
| R14 = 84.265 | D14 = 2.20 | N8 = 1.696797 | ν8 = 55.5 |
| R15 = −57.073 | D15 = 0.80 | | |
| R16 = 51.890 | D16 = 2.90 | N9 = 1.603112 | ν9 = 60.6 |
| R17 = −18.152 | D17 = 0.60 | N10 = 1.846660 | ν10 = 23.8 |
| R18 = −38.609 | D18 = Variable | | |
| R19 = −23.221 | D19 = 2.10 | N11 = 1.688931 | ν11 = 31.1 |
| R20 = −12.964 | D20 = 0.70 | N12 = 1.516330 | ν12 = 64.1 |
| R21 = 84.262 | D21 = Variable | | |
| R22 = 36.632 | D22 = 3.00 | N13 = 1.696797 | ν13 = 55.5 |
| R23 = −37.800 | D23 = 0.20 | | |
| R24 = 17.310 | D24 = 3.20 | N14 = 1.487490 | ν14 = 70.2 |
| R25 = −46.830 | D25 = 0.70 | N15 = 1.761821 | ν15 = 26.5 |
| R26 = 21.385 | D26 = 1.00 | | |
| R27 = 143.259 | D27 = 1.80 | N16 = 1.583126 | ν16 = 59.4 |
| R28 = −60.970 | D28 = Variable | | |
| R29 = ∞ | D29 = 3.06 | N17 = 1.516330 | ν17 = 64.2 |
| R30 = ∞ | | | |

| | Focal Length | | |
|---|---|---|---|
| Variable Interval | 7.41 | 29.98 | 72.52 |
| D5 | 1.00 | 23.75 | 34.45 |
| D12 | 35.25 | 12.50 | 1.80 |
| D18 | 2.87 | 10.36 | 7.33 |
| D21 | 13.25 | 2.39 | 6.64 |
| D28 | 5.00 | 8.38 | 7.16 |

Aspherical Coefficients

Nineteenth Surface k = −6.05759e−01
B = −1.24549e−05    C = −2.17570e−07    D = 5.45193e−09
E = 0.00000e+00
A' = 0   B' = 0   C' = 0   D' = 0

Twenty-eighth Surface k = −6.05759e−01
B = −2.71750e−01    C = −1.89532e−07    D = 3.70239e−09
E = 0.00000e+00
A' = 0   B' = 0   C' = 0   D' = 0
θgF1 = 0.598        θgF2 = 0.538        θgF3 = 0.543

TABLE 1

| Conditional Formula | Numerical Embodiment | | | | | |
|---|---|---|---|---|---|---|
| | 1 | 2 | 3 | 4 | 5 | 6 |
| (1) | 28.3 | 28.3 | 33.3 | 28.3 | 28.3 | 28.3 |
| (2) Left side | 0.598 | 0.598 | 0.588 | 0.598 | 0.598 | 0.598 |
| (2) Right side | 0.604 | 0.604 | 0.590 | 0.604 | 0.604 | 0.604 |
| (3) | 1.498 | 1.697 | 1.236 | 1.303 | 2.122 | 1.746 |
| (4) | 0.685 | 0.652 | 0.709 | 1.347 | 1.941 | 0.795 |
| (5) | 0.466 | 0.466 | 0.490 | 0.560 | 0.662 | 0.497 |
| (6) | −0.0016 | −0.0011 | −0.0010 | −0.0017 | −0.0016 | −0.0011 |
| (7) | 2.0033 | 2.0033 | 1.8061 | 2.0033 | 2.0033 | 2.0033 |
| (2a) Right side | 0.600 | 0.600 | 0.586 | 0.600 | 0.600 | 0.600 |

Next, an example of an optical appliance using the zoom lenses of Embodiments 1 to 6 will be described with reference to FIGS. 14 and 15.

Figure 14:
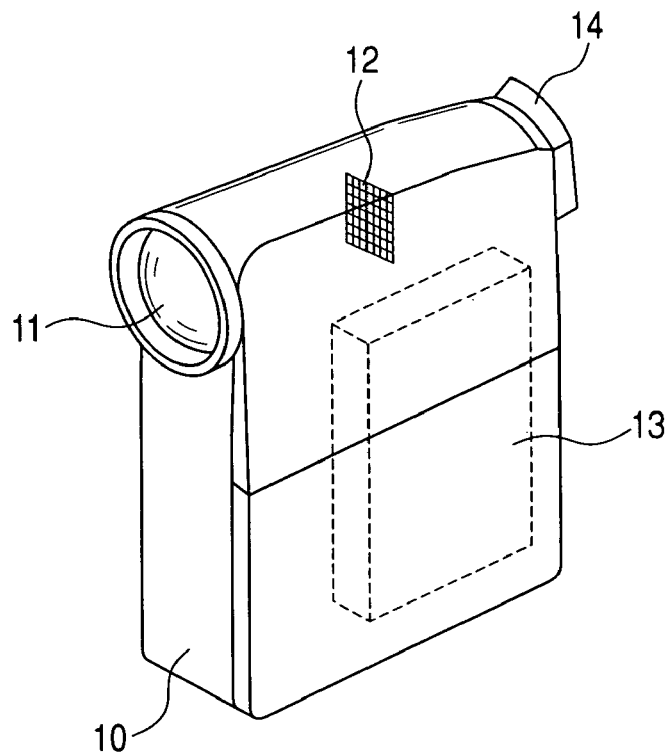
FIG. 14 is a schematic view showing main portions of a video camera.

FIG. 14 shows an example using the zoom lens system of the present invention for a video camera. In FIG. 14, reference numeral 10 denotes a camera body, 11 denotes an image taking optical system composed of any one of the zoom lenses of Examples 1 to 5, 12 denotes a solid-state image pickup element (photoelectric conversion element) such as a CCD sensor or a CMOS sensor for receiving an object image formed by the image taking optical system 11, 13 denotes a memory for recording the object image received by the solid-state image pickup element 12, and 14 denotes a finder for observing the object image. Examples of the finder 14 include an optical finder and a finder for observing an object image displayed on a display element such as a liquid crystal panel.

Figure 15:
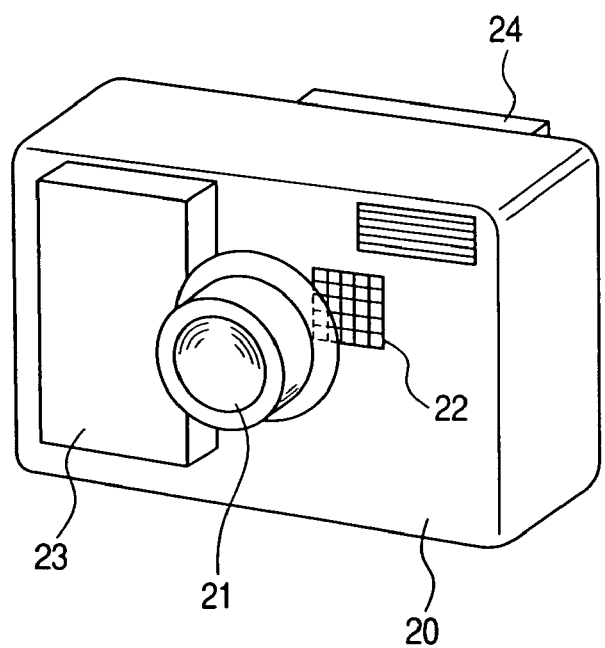
FIG. 15 is a schematic view showing main portions of a digital still camera.

FIG. 15 shows an example using the zoom lens system of the present invention for a digital still camera. In FIG. 15, reference numeral 20 denotes a camera body, 21 denotes an image taking optical system composed of any of the zoom lenses described in Examples 1 to 5, 22 denotes a solid-state image pickup element (photoelectric conversion element) such as a CCD sensor and a CMOS sensor for receiving an object image formed by the image taking optical system 21, 23 denotes a memory for recording information corresponding to the object image photoelectrically converted by the solid-state image pickup element 22, and 24 denotes a finder for observing the object image formed on the solid-state image pickup element 22, composed of a liquid crystal display panel.

Thus, by applying the zoom lens system of the present invention to an image pickup apparatus such as a video camera and a digital still camera, a small image pickup apparatus having high optical performance can be realized.

This application claims priority from Japanese Patent Application No. 2004-167215 filed Jun. 4, 2004, which is hereby incorporated by reference herein.

What is claimed is:

1. A zoom lens system, comprising:
   a first lens unit with a positive optical power, having a negative lens element;
   a second lens unit with a negative optical power;
   an aperture stop; and
   a rear lens component including at least one lens unit, which are arranged in an order from an object side to an image side, wherein
   during zooming from a wide angle end to a telephoto end, an interval between the first lens unit and the second lens unit increases, and an interval between the second lens unit and the aperture stop decreases; and
   the following conditions are satisfied:

$$vd1n < 35$$

$$\theta gF1n < -0.0027 vd1n + 0.680$$

where an Abbe number of a material constituting the negative lens element is $vd1n$, and a partial dispersion ratio is $\theta gF1n$.

2. A zoom lens system according to claim 1, wherein the following condition is satisfied:

$$1.0 < |F1n|/f1 < 3.0$$

where a focal length of the negative lens element is $F1n$, and a focal length of the first lens unit is $f1$.

3. A zoom lens system according to claim 1, wherein the following condition is satisfied:

$$0.5 < f1/ft < 2.5$$

where a focal length of the first lens unit is f1, and a focal length of the entire zoom lens system at a telephoto end is ft.

4. A zoom lens system according to claim 1, wherein the following condition is satisfied:

$$0.3 < |f2| < (fw \times ft)^{-1/2} < 0.8$$

where a focal length of the second lens unit is f2, a focal length of the entire zoom lens system at a wide angle end is fw, and a focal length of the entire zoom lens system at a telephoto end is ft.

5. A zoom lens system according to claim 1, wherein:
the first lens unit has a positive lens element; and
the following condition is satisfied:

$$-0.0024 < (\theta gF1n - \theta gF1p)/(vd1n - vd1p)$$

where an Abbe number of a material constituting a positive lens element whose Abbe number is largest in the first lens unit is vd1p, and a partial dispersion ratio is θgF1p.

6. A zoom lens system according to claim 1, wherein the following condition is satisfied:

$$1.80 < N1n$$

where a refractive index of the negative lens element is N1n.

7. A zoom lens system according to claim 1, wherein the rear lens component comprises a third lens unit with a positive optical power and a fourth lens unit with a positive optical power, which are arranged in an order from an object side to an image side.

8. A zoom lens system according to claim 1, wherein the rear lens component comprises a third lens unit with a positive optical power, a fourth lens unit with a negative optical power, and a fifth lens unit with a positive optical power, which are arranged in an order from an object side to an image side.

9. A zoom lens system according to claim 1, wherein the zoom lens system forms an image on a photoelectric conversion element.

10. An image pickup apparatus, comprising:
the zoom lens system according to claim 1; and
a photoelectric conversion element receiving light representative of an image formed by the zoom lens system.

* * * * *